United States Patent [19]
Takahisa et al.

[11] Patent Number: 5,812,937
[45] Date of Patent: *Sep. 22, 1998

[54] BROADCAST DATA SYSTEM WITH MULTIPLE-TUNER RECEIVER

[75] Inventors: Tsutomu Takahisa, Santa Clara, Calif.; Koyo Hasegawa, Tokyo, Japan

[73] Assignee: Digital DJ Inc., Milpitas, Calif.

[*] Notice: The term of this patent shall not extend beyond the expiration date of Pat. No. 5,577,266.

[21] Appl. No.: 643,801

[22] Filed: May 6, 1996

Related U.S. Application Data

[63] Continuation-in-part of Ser. No. 549,655, Oct. 27, 1995, Pat. No. 5,577,266, Ser. No. 425,993, Apr. 20, 1995, Pat. No. 5,579,537, and Ser. No. 45,352, Apr. 8, 1993, Pat. No. 5,491,838.

[51] Int. Cl.[6] .................................................... H04B 7/00
[52] U.S. Cl. ............................................. 455/66; 455/45
[58] Field of Search .............................. 455/3.1, 6.3, 45, 455/66, 68, 70, 154.1, 158.2, 158.4, 158.5, 186.1, 185.1, 186.2; 381/3, 4

[56] References Cited

U.S. PATENT DOCUMENTS

| | | | |
|---|---|---|---|
| 3,696,297 | 10/1972 | Otero | 325/55 |
| 3,761,888 | 9/1973 | Flynn | 340/172.5 |
| 3,922,607 | 11/1975 | Wysong | 325/48 |
| 4,379,947 | 4/1983 | Warner | 179/1 GD |
| 4,380,027 | 4/1983 | Leventer et al. | 358/147 |
| 4,392,246 | 7/1983 | Niioka et al. | 455/158 |
| 4,450,531 | 5/1984 | Kenyon et al. | 364/604 |
| 4,633,495 | 12/1986 | Schotz | 381/3 |
| 4,686,707 | 8/1987 | Iwasaki et al. | 455/200 |
| 4,698,842 | 10/1987 | Mackie et al. | 381/1 |
| 4,706,121 | 11/1987 | Young | 358/142 |
| 4,829,588 | 5/1989 | Welsh | 372/92 |
| 4,843,562 | 6/1989 | Kenyon et al. | 364/487 |
| 4,879,751 | 11/1989 | Franks et al. | 381/119 |

(List continued on next page.)

FOREIGN PATENT DOCUMENTS

| | | | |
|---|---|---|---|
| 0 135 192 A2 | 3/1985 | European Pat. Off. | H04H 1/00 |
| 0 333 194 A | 9/1989 | European Pat. Off. | H03J 7/18 |
| 0 367 585 A3 | 11/1989 | European Pat. Off. | H04N 9/00 |
| 0 459 360 A | 12/1991 | European Pat. Off. | H04H 1/00 |
| 0 461 436 A1 | 12/1991 | European Pat. Off. | H04H 1/100 |
| 0545 457 A1 | 6/1993 | European Pat. Off. | G08B 5/22 |
| 0 595 314 A | 5/1994 | European Pat. Off. | H03J 1/00 |
| 0 603 792 A | 6/1994 | European Pat. Off. | H03J 1/00 |
| 0 658 989 A1 | 12/1994 | European Pat. Off. | H04H 1/00 |
| 40 36 851 A1 | 5/1991 | Germany | H04H 1/00 |
| 44 22 015 C1 | 6/1994 | Germany | H04L 5/00 |

(List continued on next page.)

OTHER PUBLICATIONS

Yamada, O. et al., "NHK'S High Capacity FM Subcarrier System", NAB 1993 Broadcast Engineering Conference Proceedings, pp. 415–423.

Dietze, A., "SDA 1000 Decodes Radio Data Signals", Siemans Components XXV, vol. 3, Jul. 1990, pp. 86–91.

Adam Bryan, Business Technology, *The New York Times*, "For the Lowly Radio, New Tricks Are in Store", Feb. 17, 1993.

National Association of Broadcasters, *Radio TechCheck*, "RBDS and AMAX Demo at Winter Consumer Electronics Show", Jan. 18, 1993, p. 1.

(List continued on next page.)

*Primary Examiner*—Reinhard J. Eisenzopf
*Assistant Examiner*—Marsha D. Banks-Harold
*Attorney, Agent, or Firm*—Fenwick & West LLP

[57] ABSTRACT

A broadcast transmitting and receiving system includes a receiver having multiple tuners. A data tuner receives a data stream indicating the type of programming being broadcast by one or more stations. Based on information in the data stream, the frequency of operation of a sound tuner is adjusted to provide the user with a desired type of programming. Various modes of operation are provided, some employing a user interface and others being operable without user intervention.

12 Claims, 20 Drawing Sheets

U.S. PATENT DOCUMENTS

| | | | |
|---|---|---|---|
| 4,887,308 | 12/1989 | Dutton | 455/156 |
| 5,023,938 | 6/1991 | Takegawa et al. | 455/183 |
| 5,063,610 | 11/1991 | Alwadish | 455/45 |
| 5,134,719 | 7/1992 | Mankovitz | 455/154.1 |
| 5,182,640 | 1/1993 | Takano | 358/86 |
| 5,210,611 | 5/1993 | Yee et al. | 358/191.1 |
| 5,212,551 | 5/1993 | Conanan | 358/143 |
| 5,214,792 | 5/1993 | Alwadish | 455/45 |
| 5,349,386 | 9/1994 | Borchardt et al. | 348/485 |
| 5,379,454 | 1/1995 | Takegawa et al. | 455/158.5 |
| 5,406,626 | 4/1995 | Ryan | 380/9 |
| 5,457,815 | 10/1995 | Morewitz, II | 455/161.1 |
| 5,457,816 | 10/1995 | Koyama | 455/161.2 |
| 5,491,838 | 2/1996 | Takahisa et al. | 455/66 |
| 5,564,043 | 10/1996 | Takahisa | 455/66 |
| 5,628,061 | 5/1997 | Shirakawa | 455/186.1 |

FOREIGN PATENT DOCUMENTS

| | | | |
|---|---|---|---|
| 2 046 967 | 4/1980 | United Kingdom | H04H 1/00 |
| 2 223 150 | 7/1989 | United Kingdom | H04N 7/087 |
| WO 85/05748 | 12/1985 | WIPO | H04J 1/02 |
| WO 95/27349 | 10/1995 | WIPO | H04N 7/08 |
| WO 95/28044 | 10/1995 | WIPO | H04N 1/00 |
| WO 95/28803 | 10/1995 | WIPO | H04N 7/08 |

OTHER PUBLICATIONS

*Inside IVHS*, "NHK Swedish Telecom Achieve 16 Kbps With FM Subcarrier", Sep. 14, 1992, pp. 4 and 5.

*United States RBDS Standard*, "Draft No. 2.0, NRCS Document", Aug. 1, 1992.

T. Isobe, T. Kuroda, M. Takada, O. Yamada, "Traffic Information Services Using FM Multiplex Broadcasting", *IVHS Workshop of Communicating with Vehicles*, Jul. 23, 1992, pp. 1–8.

M. Takada, T. Kuroda, S. Moriyama, and O. Yamada, Error–Correction Schemes of FM Multiplex Broadcasting and Its System Applications, *NHK Labs*, Japan, No. 9.4.

T. Kuroda, M. Takada, and O. Yamada, "Development of an FM multiplex broacasting system having a large transmission capacity", *IBC*, Brighton, 1990, pp. 241–245.

BROADCAST DATA SYSTEM WITH MULTIPLE-TUNER RECEIVER

RELATED APPLICATIONS

This is a continuation in part of U.S. patent application Ser. No. 08/549,655, filed Oct. 27, 1995, now U.S. Pat. No. 5,577,266, which is a continuation in part of U.S. patent application Ser. No. 08/425,993, filed Apr. 20, 1995, now U.S. Pat. No. 5,579,537, which is a continuation in part of U.S. patent application, Ser. No. 08,045,352, filed Apr. 8, 1993, now U.S. Pat. No. 5,491,838.

BACKGROUND AND FIELD OF THE INVENTION

This invention relates generally to broadcasting systems, and specifically to a system for transmitting and receiving data using one tuner for control of a second tuner.

Many radio broadcast systems are known to exist in which digital data are transmitted along with audio program material. For example, the United States Radio Broadcast Data System ("RBDS") Standard, published by the National Radio Systems Committee and sponsored by the Electronics Industry Association and the National Association of Broadcasters, describes a system for broadcasting a variety of program-related information on a subcarrier of a standard FM broadcast channel. The RBDS standard teaches a system for transmitting station identification and location information, as well as time, traffic and miscellaneous other information.

U.S. Pat. No. 5,063,610 to Alwadish discloses a system in which advertising text, song titles, or other program-related data may be transmitted along with audio program material and stored, displayed, or printed by a listener using appropriate receiving apparatus. The Alwadish system is understood to require data corresponding to program material to be stored along with the program material source itself (i.e., on compact disc or digital audio tape). Thus, the Alwadish system relies on customized audio program source hardware and software.

In another field of art, several systems have been taught for automatically monitoring received broadcast signals in order to log the program content of such broadcasts. For instance, U.S. Pat. Nos. 4,450,531 and 4,843,562 to Kenyon et al. teach schemes for automatically recognizing received program material as one of a number of "reference" library programs.

Notably absent from the known prior art, however, is a system for broadcasting program material and associated data that does not rely on customized program source material and related apparatus in which the program and the data are linked at the program source level. It would be desirable to have a system in which conventional program sources (e.g., conventional phonograph records, tape cartridges, or compact discs) could be played using conventional program source apparatus (e.g., conventional turntables, tape cartridge players and compact disc players), yet still provide the advantages of transmitting data pertaining to the program material.

It would also be desirable to have systems and methods for applying such broadcast data to diverse uses, and to provide such systems and methods with improvements that provide additional features and benefits.

SUMMARY OF THE INVENTION

In accordance with the present invention, a broadcast transmission and reception system includes a transmitter subsystem having (a) program sources, (b) a device for applying to a transmitter program material from the program sources, and (c) a device for applying to a transmitter a data stream corresponding to the program material for transmission along with the program material; and a receiver subsystem having (a) a demodulator unit for detecting the program material and data stream, and (b) a device for changing frequency for the receiver subsystem in response to the data stream.

Also in accordance with the present invention, the receiver subsystem includes a user interface device allowing user selection of an item from a menu of data options, wherein the device for changing frequency operates in response to the item.

In another aspect of the invention, a receiver includes a first tuner adapted to receive program material from a first broadcast station, a second tuner adapted to receive a data stream from a second broadcast station, and a processor operatively coupled to the first tuner and the second tuner, the processor adapted to receive as input signals from the second tuner corresponding to the data stream and to produce as output signals causing the second tuner to change operating frequency.

In still another aspect of the invention, the second tuner scans among available frequencies and collects data from a plurality of broadcast stations.

The features and advantages described in the specification are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DESCRIPTION OF A PREFERRED EMBODIMENT

The figures depict a preferred embodiment of the present invention for purposes of illustration only. One skilled in the art will readily recognize from the following discussion that alternative embodiments of the structures and methods illustrated herein may be employed without departing from the principles of the invention described herein.

Figure 1:
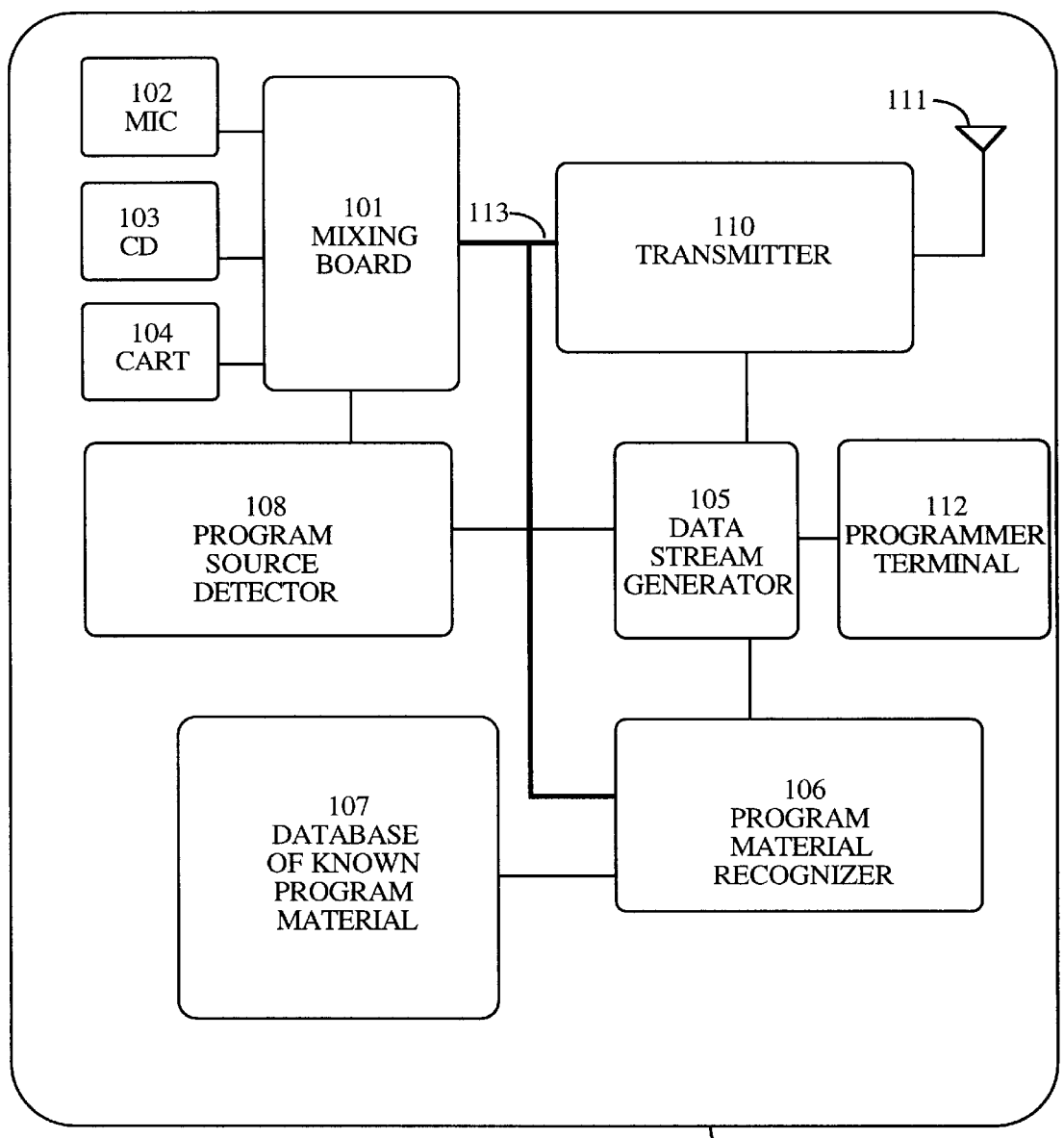
FIG. 1 is a block diagram of a transmission system for program material and associated data, in accordance with the present invention.

Referring now to FIG. 1, there is shown a transmission system 100 in accordance with the present invention. The operation of the transmission system 100 is illustrated by discussion of the component parts illustrated in FIG. 1. Conventional audio sources such as microphone 102, compact disc player 103, and tape cartridge player 104 provide program source audio to mixing board 101. Mixing board 101 and audio sources 102–104 may be conventional units, such as those already present in a typical radio broadcast station. Audio output is fed from mixing board 101 to transmitter 110 in the conventional manner over an audio bus 113 for transmission from antenna 111. Transmitter 110 may be any conventional radio broadcasting transmitter with main channel and subcarrier channel input capabilities, such as that typically installed in modern FM broadcasting stations. Additional conventional audio compression, limiting, or other processing circuitry (not shown) may be installed at mixing board 101, transmitter 110, or in between, but is not pertinent for purposes herein.

The audio output of mixing board 101 is also applied to a program material recognizer 106 via audio bus 113. The purpose of the program material recognizer 106 is to compare the program material coming from mixing board 101 with a database of known program material 107. If a match is detected, program material recognizer 106 sends pertinent program data, for instance the title of the program material, the composer, and the performer, to data stream generator 105. Any suitable program recognizing system can be used to implement program material recognizer 106 and database of known program material 107, for instance the system taught by Kenyon et al. in U.S. Pat. No. 4,843,562 for received broadcast audio signals. The teachings of U.S. Pat. No. 4,843,562 are incorporated herein by reference. Those skilled in the art may readily apply such known systems for recognizing audio programs to implement the program material recognizer 106 and database of known program material 107 of FIG. 1.

The output data provided by program material recognizer 106 are converted by data stream generator 105 into a form that may be directly applied to a conventional subcarrier channel input of transmitter 110. The manner of making this conversion will depend on the particular program material recognizer 106 employed and the desired data format for transmission, and may readily be accomplished by one skilled in the art. In a preferred embodiment, data stream generator 105 is configured to conform to the large transmission capacity multiplex data broadcast system protocol promulgated by NHK (Japan Broadcasting Corporation) known as L-MSK. This protocol permits data transmission speeds of up to 32 kbits per second.

Mixing board 101 also provides a signal, either through an existing facility on mixing board 101 or through a simple modification, representative of which program source (i.e., microphone 102, compact disc player 103 or tape cartridge player 104) is currently selected by mixing board 101. Program source detector 108 converts this signal to a form usable by data stream generator 105. While the particular implementation of program source detector 108 may vary with the type of mixing board 101, those skilled in the art will readily be able to implement program source detector 108 for operation with any particular mixing board 101.

Data stream generator 105 generates different data streams depending on the program source detected by program source detector 108. For example, if program source detector 108 indicates that compact disc player 103 or tape cartridge player 104 is selected by mixing board 101, then data stream generator 105 applies to transmitter 110 the information generated by program material recognizer 106. However, if program source detector 108 indicates that microphone 102 is selected, then data stream generator 105 may generate data identifying the announcer's name, or the fact that news or traffic information is being broadcast, as appropriate for the use to which microphone 102 is put. If microphone 102 is put to multiple uses, then a general message such as the station's call sign or a random advertisement may be generated by data stream generator 105. Thus, in operation, data stream generator 105 provides a stream of data to transmitter 110 indicating, for example, details about a musical composition played on compact disc player 103, then advertiser information corresponding to a commercial played on tape cartridge machine 104, then an appropriate message corresponding to the selection of microphone 102 such as "Traffic Alert".

In one embodiment of the present invention, database of known program material 107 contains both the data needed by program material recognizer 106 to recognize a particular program, and also the data associated with that program to be sent to transmitter 110 via data stream generator 105. The data associated with the program material can be entered, as known with regard to conventional recognition systems, by manual key entry from programmer terminal 112 or by some other common data entry method. Programmer terminal 112 may be a dedicated computer terminal or may be a personal computer connected to data stream generator 105 via a conventional local area network. Database 107 may be provided by a third party, for instance in the form of computer tapes or disks containing both the data needed for recognition and the data desired for transmission. In such an embodiment, other data associated with program material, such as data associated with commercial announcement program material, may be separately entered into database 107 using conventional data entry techniques. Furthermore, data to be transmitted when program source detector 108 indicates selection of microphone 102 may be stored either as part of database 107 or in a separate database (not shown). Those skilled in the art will recognize that any such choice that provides associated data for transmission may be used in accordance with the present invention.

As is evident from FIG. 1, none of the existing components of a conventional broadcast station, with the possible exception of the mixing board 101 as discussed above, needs to be replaced or altered to implement transmission system 100. An upgrade from a conventional transmission system to the transmission system 100 of FIG. 1 requires only the connection of the program source detector 108 to the mixing board 101, tap-off of the audio program material feed between mixing board 101 and transmitter 110 to program material recognizer 106, and connection from data stream generator 105 to a subcarrier channel input of transmitter 110.

Figure 1A:
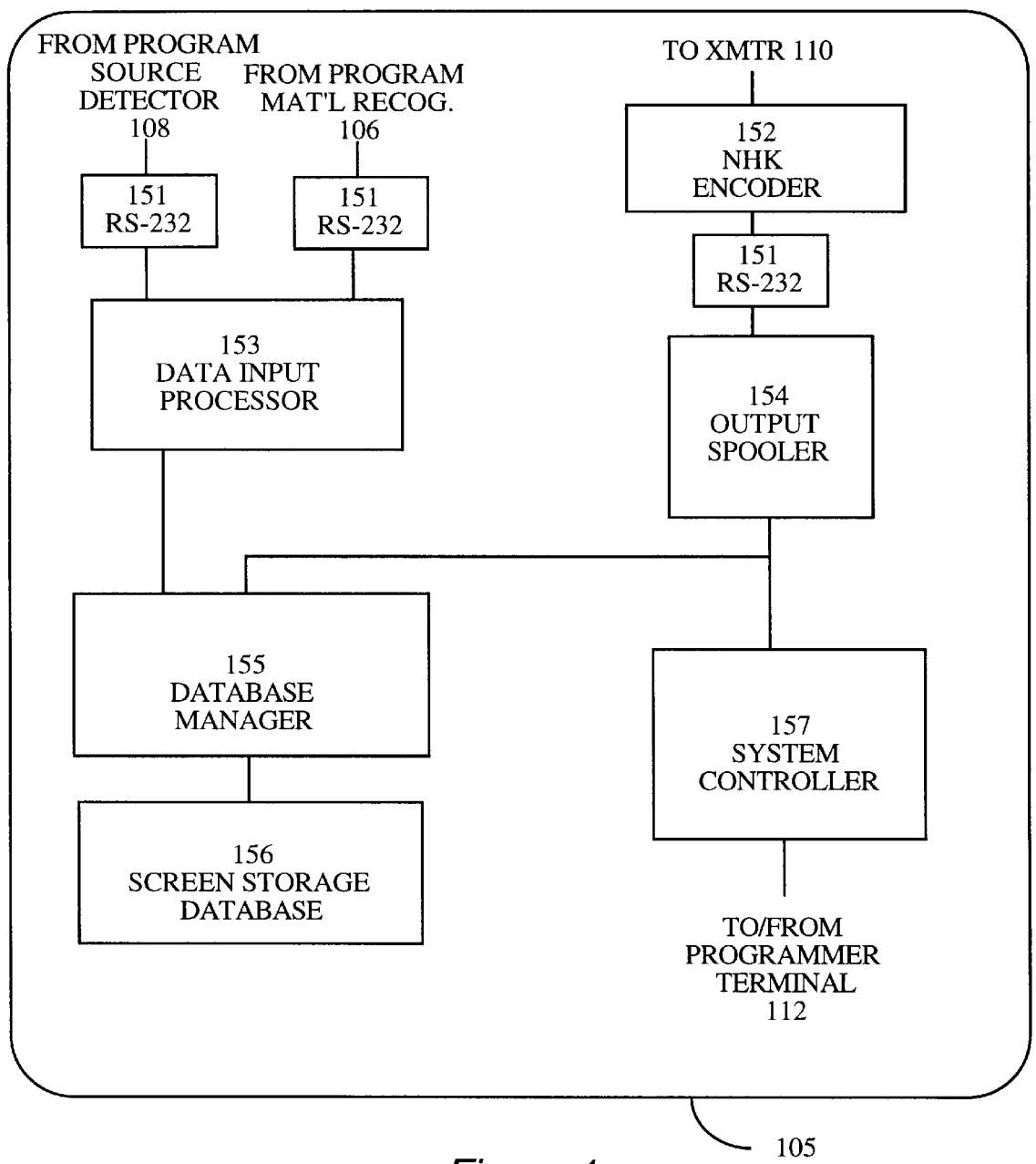
FIG. 1a is a block diagram detailing a data stream generator as illustrated in FIG. 1.

Referring now to FIG. 1a, there is shown a detailed functional block diagram of data stream generator 105. The major components of data stream generator 105 include a data input processor 153, database manager 155, system controller 157, output spooler 154, and NHK encoder 152. Data input processor 153 receives program source data from program source detector 108 via a serial RS-232 data link 151, and receives program recognition data from program material recognizer 106, also via a serial RS-232 data link 151. Data input processor 153 uses this input data to determine which data from a screen storage database 156 should be accessed, using database manager 155, and sent to output spooler 154. For example, if data input processor 153 receives data indicating that a compact disc player is active and that the program material being broadcast is a musical selection known as "Concertino for Piano and Chamber Ensemble", it will cause a database entry corresponding to data particular to that selection to be extracted from screen storage database 156 and applied, through database manager 155, to output spooler 154. The database entry would include all of the data required for display of information of data associated with the musical selection on a receiver, as described below in connection with FIGS. 3 and 4.

A system controller 157 is coupled to database manager 155 and output spooler 154 for two discrete purposes. First, system controller 157 provides timing and control signals to regulate the movement of data from database manager 155 to output spooler 154. Second, system controller 157 provides, through a connection with a programmer terminal 112, a means by which data may be inserted into screen storage database 156, through database manager 155. For instance, radio station personnel may key in data to be associated with any particular entry of screen storage database, to permit such information to be transmitted over the system when the associated program material selection is played. As a specific example, if there is to be a public performance of "Concertino for Piano & Chamber Ensemble" at a local symphony hall, that fact may be entered into screen storage database 156 so that whenever this musical selection is played, this information will be transmitted for display on the user's receiver. Further discussion regarding data entry is provided below in connection with FIG. 9.

Output spooler 154 is a buffer that stores data to be transmitted and sends such data, via RS-232 serial data link 151, to an NHK data encoder to permit transmission of the data using transmitter 110. NHK data encoder transforms the data from output spooler 154 into a data stream meeting the specifications of the NHK high capacity multiplex data broadcast protocol L-MSK described above. One example of a commercially-available device operating in accordance with this protocol is the model 4001A FM Multiplex Signal Transmitter for Mobile Receivers available from Eiden Company Limited, Tokyo, Japan.

In the preferred embodiment, components 152–157 are implemented by using a programmed general purpose computer. Those skilled in the art may easily implement the functions of these components in such a manner.

Figure 2:
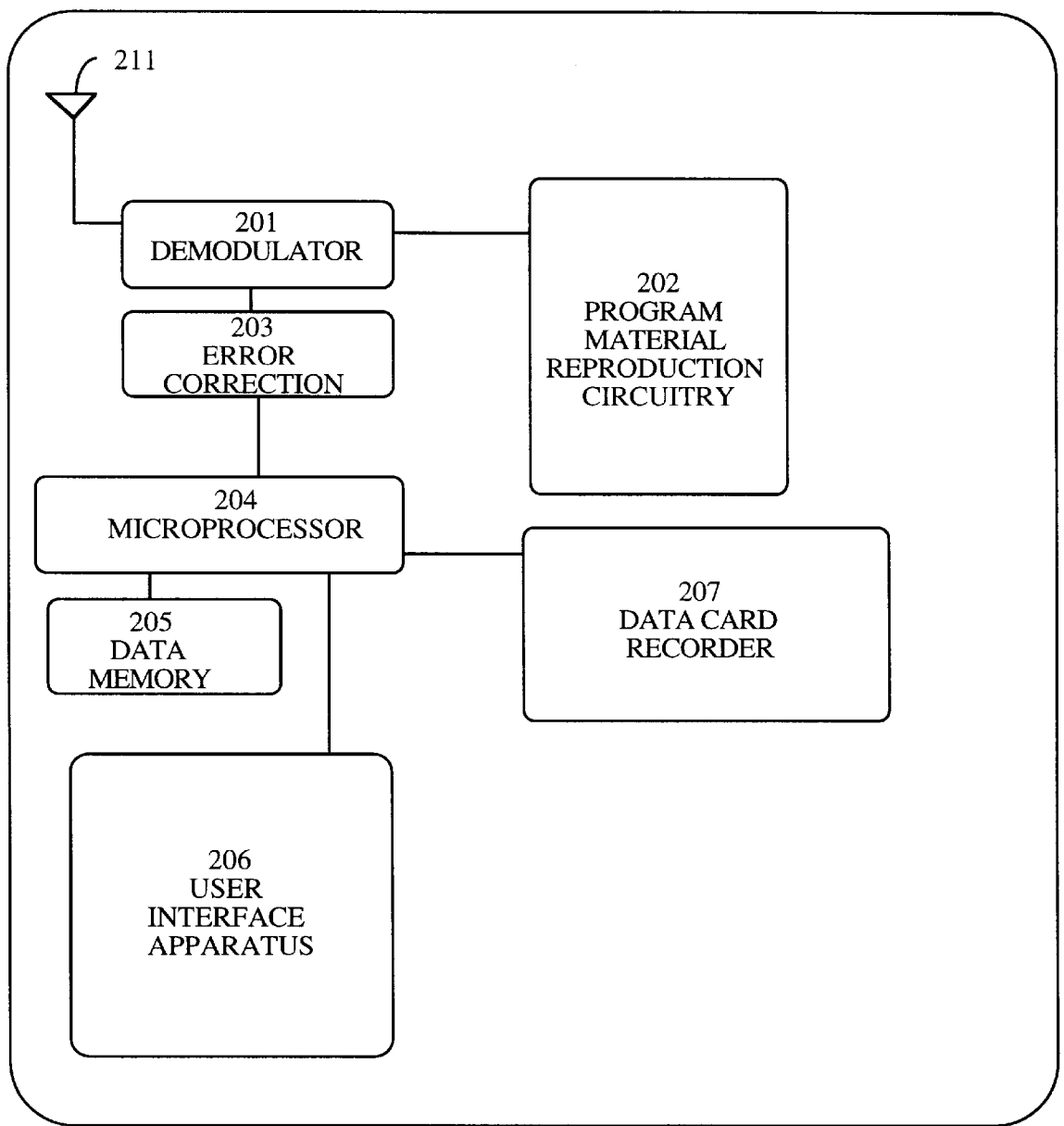
FIG. 2 is a block diagram of a receiving system for program material and associated data, in accordance with the present invention.

Referring now to FIG. 2, there is shown a receiving system 200 in accordance with the present invention. The operation of the receiving system 200 is illustrated by discussion of the component parts illustrated in FIG. 2. A signal transmitted by transmission system 100 of FIG. 1 is received by antenna 211 and demodulated into audio and data components in a conventional manner by demodulator 201. Demodulator 201 is of conventional design for detecting and demodulating audio and data signals transmitted over a main broadcast channel and a subcarrier of that channel, respectively. Audio program information from demodulator 201 is applied to conventional program material reproduction circuitry 202. Data associated with the program material (corresponding to that generated by data stream generator 105 of FIG. 1) are error corrected in a conventional manner by error correction circuitry 203, transferred to microprocessor 204, and then are stored in data memory 205, using any of the conventional techniques and devices well known to those skilled in the art.

A user interface apparatus 206 allows a user of receiving system 205 to selectively access data stored in 203. User interface apparatus 206 is implemented using a conventional microprocessor-based design well known to those skilled in the art of user interface design and implementation. User interface apparatus 206 provides both display capabilities for the transmitted data and user input capabilities to permit user selection of portions of the transmitted data.

A conventional data card recorder 207, such as that used to record information on magnetic library cards or the like, is connected to data memory 205 through microprocessor 204. The purpose of data card recorder 207 is to allow the user of receiving apparatus 200 to store selected data on portable magnetic cards. For instance, data associated with a promotion by an advertiser may be used as "electronic coupons" to allow listeners who record such data to receive a discount on merchandise. The coupon data could include standardized identifying data for a product, such as the "SKU" code for a product. A corresponding magnetic card reader of conventional design (not shown) would be used at the store where the coupon is to be redeemed.

Receiving system 200 may readily be implemented by augmenting a conventional broadcast receiver capable of providing the functions of demodulator 201, program material reproduction circuitry 202, and antenna 211, with the digital data functions corresponding to error correction circuitry 203, microprocessor 204, data memory 205, user interface apparatus 206, and, if desired, data card recorder 207. Alternatively, the functions of elements 203–207 may be implemented by a general purpose digital computer, such as a conventional personal computer, notebook computer, or home entertainment computer, and antenna demodulator 201, program material reproduction circuitry 202, and antenna 211 may be implemented by an attached device or an add-in circuit card. In such a case, the general purpose digital computer may even be employed to provide the audio/video program material output of the main programming channel, as would conventionally be provided by program material reproduction circuitry 202. Those skilled in the art will readily recognize additional possible implementations in accordance with the present invention.

In some applications, it may be important for significant amounts of data corresponding to the broadcast audio material to be available as soon as the audio material is transmitted. Depending on the particular implementation of transmission system 100, complete data corresponding to a particular item of audio program material may not be available at receiver 200 until several seconds after the commencement of that item of program material. While this may be acceptable in some situations, e.g., where the item of program material is a symphonic piece of a significant duration, in other instances the time delay may not be desirable. To ameliorate any problems that may be caused by this data lag, a conventional audio delay device is included in the path of the audio program material so that the broadcast of the audio material is delayed by a predetermined duration comparable to the time desired for data to be accumulated at receiver 200. In one such implementation, a time delay device is integrated into transmitter 100 so that the audio applied to program material recognizer 106 is not delayed, while the audio that is broadcast by transmitter 110 is delayed.

In an alternate embodiment in which the program material to be transmitted is known in advance, such as where a computerized "playlist," identifying each item of program material and the time that it is to be broadcast, is available to data stream generator 105, data corresponding to that program material may be scheduled to be broadcast before the actual audio program material, thus providing the same effect as discussed above without the need for any audio delay device.

Figure 3:
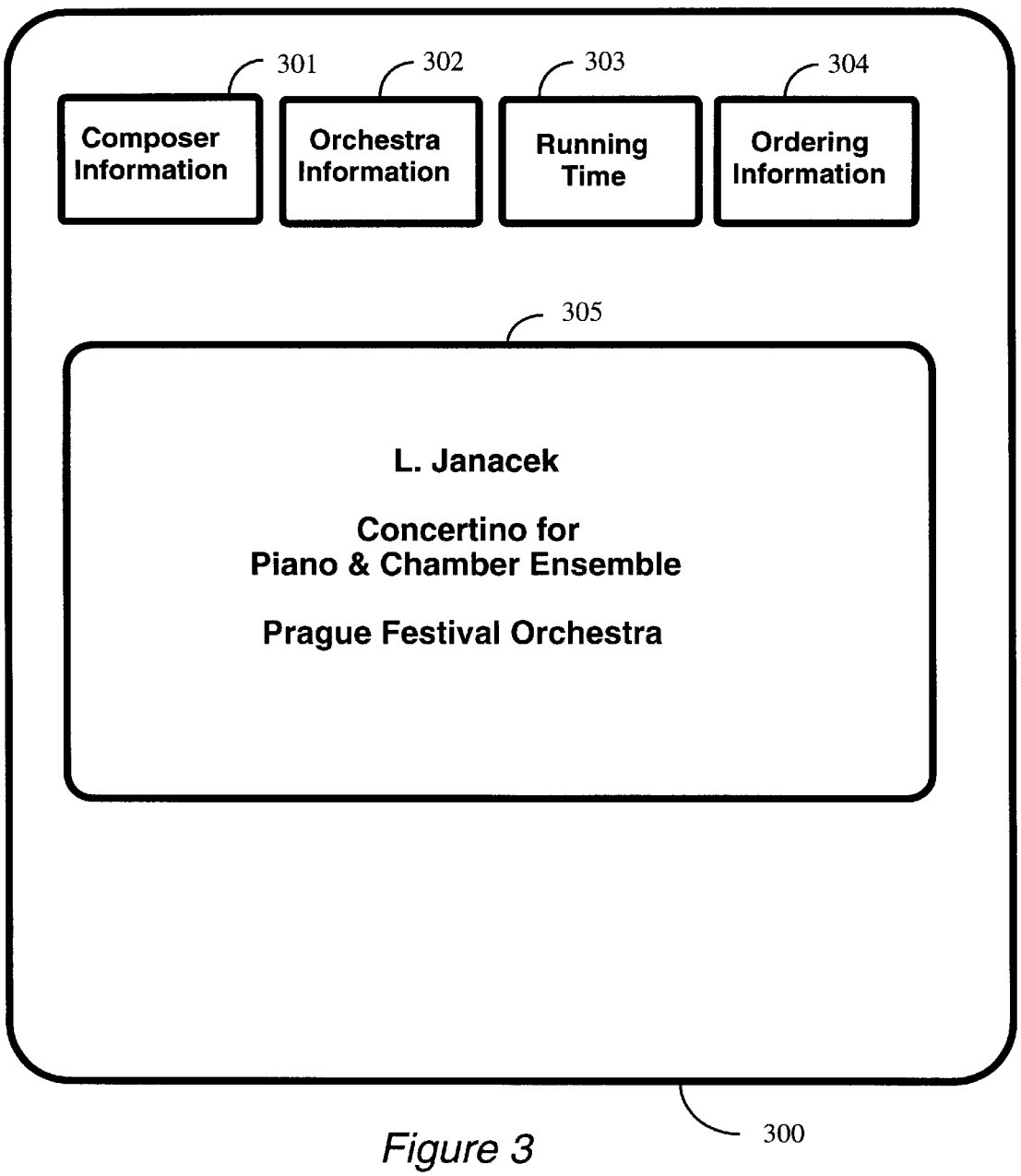
FIG. 3 is an illustration of a user interface display panel showing information about a musical composition, in accordance with the present invention.

Referring now to FIG. 3, there is shown a display panel 300 of user interface apparatus 206. Display panel 300 includes four menu button areas 301–304 and a larger information window 305. In the preferred embodiment, display panel 300 is of conventional liquid crystal design, with conventional touch-screen technology being used to implement switches over the menu button areas 301–304. Alternatively, physically separate switches could be used in locations adjacent to menu button areas 301–304, but one advantage of using touch-screen technology is that button areas can dynamically change in size, location and number under software control. The information window 305 of FIG. 3 indicates composer, title, and performer data stored in memory 205, corresponding to program material contemporaneously being received by receiving system 200. Menu button area 301 provides the user the option of requesting another screen with further information about this composer; menu button area 302 provides the user with the option of requesting orchestra information; menu button area 303 provides the user with the option of requesting another screen with information on the running time of the current selection; and menu button area 304 provides the user with the option of requesting ordering information for this recording. It should be recognized that the information presented in information window 305 and menu button areas 301–304 can be of virtually infinite variety and is not limited to the type of information or layout shown in FIG. 3.

In an alternate embodiment some top-level menu choices may be stored in permanent memory (not shown) of user interface apparatus 206, but in general all of the information displayed on display panel 300, as well as the number, style, and labeling of the button areas (e.g., 301–304) is determined by data generated by data stream generator 105, transmitted to receiving system 200, and stored in data memory 205. For convenience, data corresponding to menu button areas (e.g., 301) are referred to as header data. The number of menu choices and the amount of displayable information is limited only by the bandwidth of the data transmission subcarrier channel and the capacity of data memory 205. Within these limits, each radio station may choose to include as much or as little header data as it desires, and may custom-design the menu information and layout that appear on the display panel 300.

Figure 4:
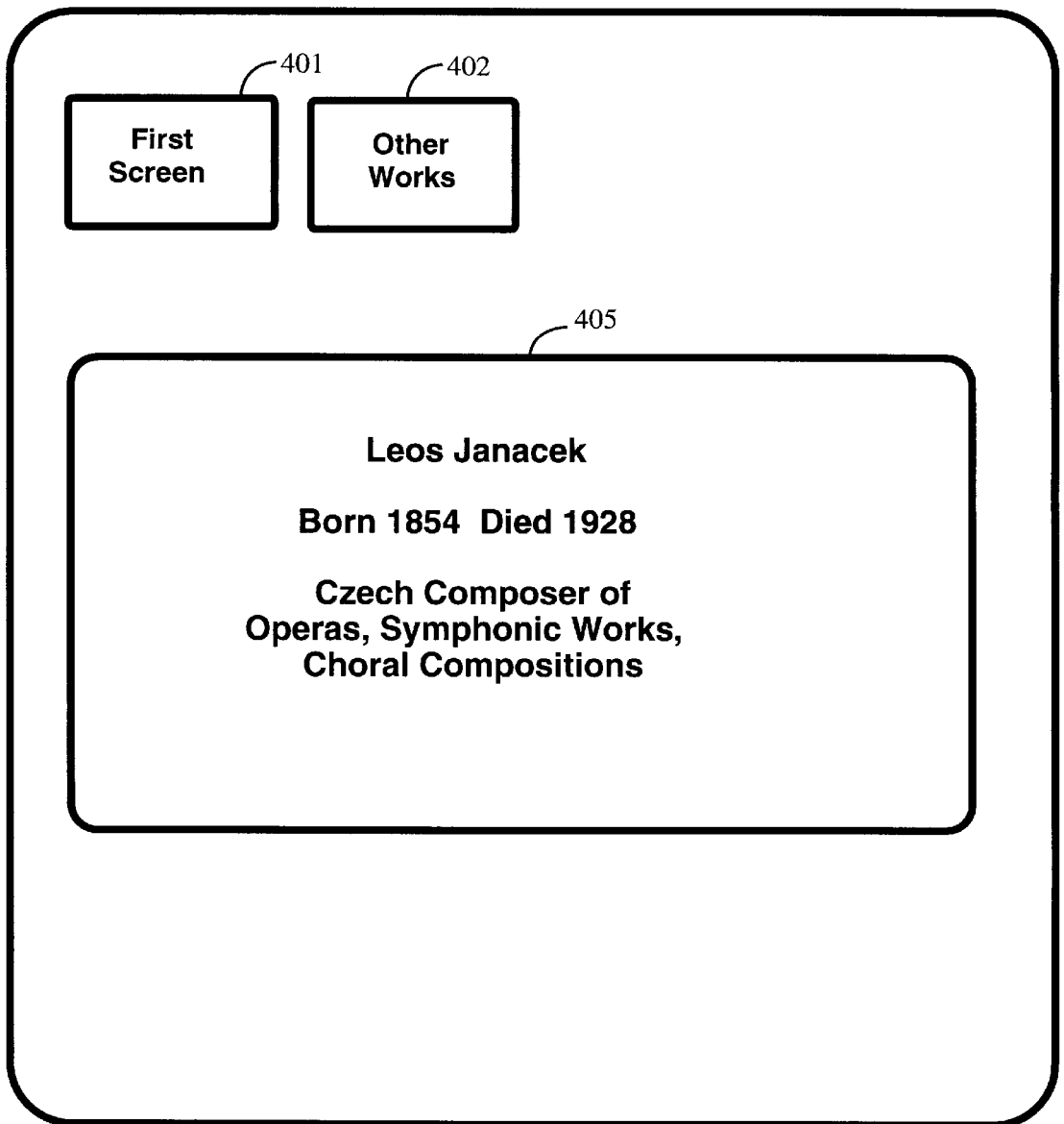
FIG. 4 is an illustration of a user interface display panel showing information about a composer, in accordance with the present invention.

Referring now to FIG. 4, there is shown display panel 300 after the user has touched menu button area 301 of FIG. 3 to request a screen with more information about the composer. Information window 405 now displays different information than in information window 305 of FIG. 3. Menu button area 301 of FIG. 3 is replaced with menu button 401 providing the user with the capability of returning to the first screen (i.e., the screen of FIG. 3). Button area 302 of FIG. 3 is replaced with button area 402 providing the user with a further choice of viewing a screen indicating other works by the composer. There being no other options under this menu path, button areas 303, 304 of FIG. 3 have not been replaced with corresponding button areas in FIG. 4.

Figure 5:
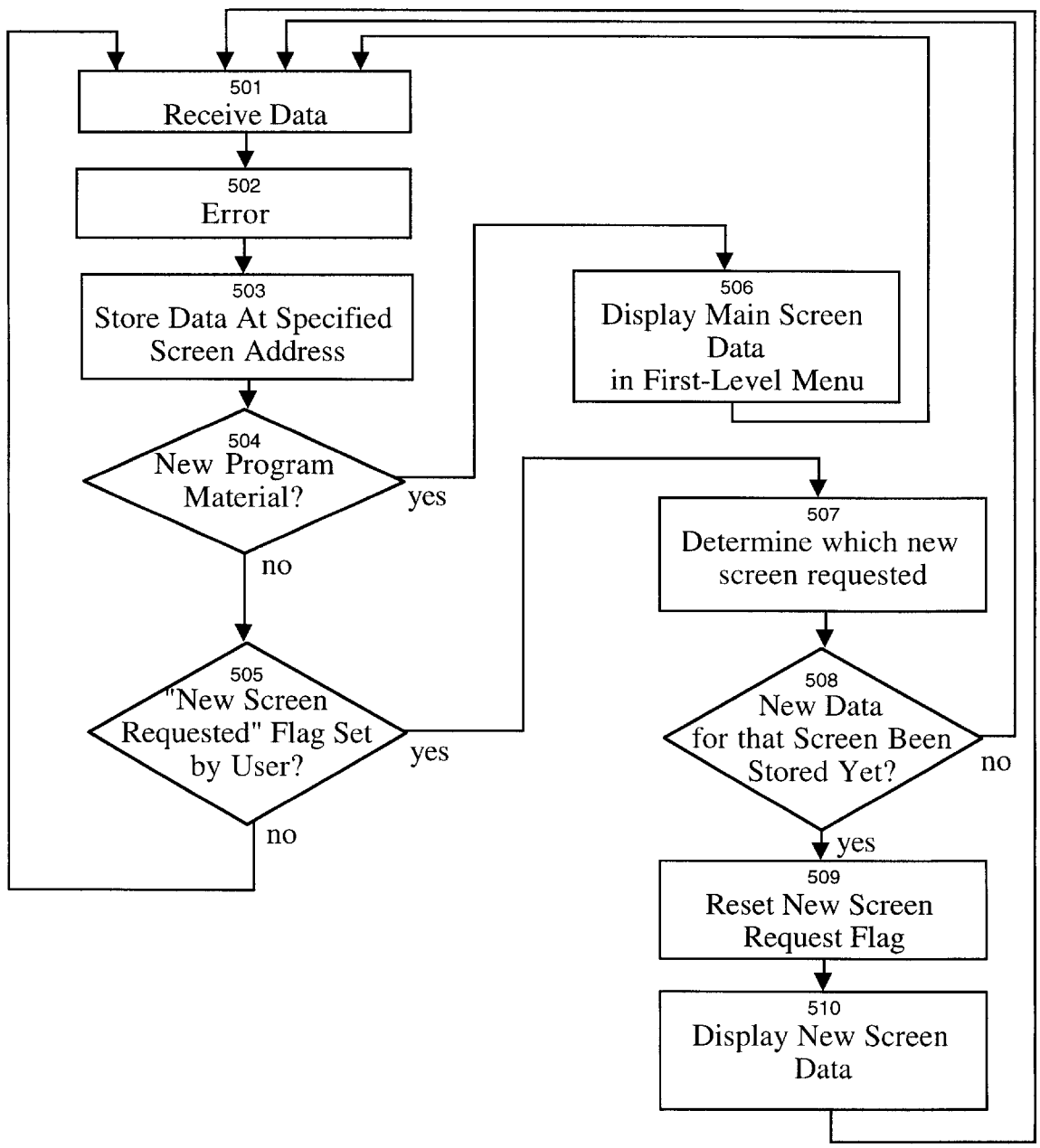
FIG. 5 is a flow diagram illustrating receiver operation, in accordance with the present invention.

Referring now to FIG. 5, there is shown a procedure for receiving and displaying data as described in connection with FIGS. 3 and 4. The process begins by receiving data at step 501. Next, step 502 performs error correction to validate the data received. This being accomplished, the received and validated data are stored in step 503 at a specified address for later use. A check is then made in step 504 to determine whether, based on received data, new program material, e.g., a new musical selection, is currently being transmitted. If not, a check is made at step 505 to determine whether the user has requested a new screen by making a selection on one of the screen button areas, e.g., 301–304. A new screen request is indicated by a "new screen request flag" being set. If the new screen request flag has not been set, processing returns to step 501 for the acquisition of further data.

If the check at step 504 indicates that new program material is being transmitted, processing flows to step 506, in which a new main menu screen for that new program material is displayed. In accordance with the present invention, the first data transmitted for new program material correspond to the main menu screen for that selection, so as soon as a new program is detected, main screen data for that material should already be available. Upon displaying the new main screen data in step 506, processing returns to step 501 for the acquisition and validation of further data corresponding to other screens. In a preferred embodiment, once a new program selection is detected, data from a previous program selection need not be discarded, but may be stored for later access by the user. In an alternate embodiment, users may recall data from several preceding selections, if desired. For example, if users hear a musical selection that they like, but that they do not realize they would like to order until after the selection is complete, they may still access ordering information for that selection after the next selection begins. Conventional techniques well known to those skilled in the art may be used to store and retrieve such information from previous selections.

If the check in step 505 indicates that a user has requested a new screen, processing flows to step 507, where a determination is made as to the particular new screen requested. Next, step 508 checks to see whether data for that new screen have yet been stored for the current program selection. If not, processing returns to step 501 to allow further data to be acquired. If the requisite data have been stored for that screen, step 509 resets the new screen request flag and step 510 displays the new screen. Processing then returns to step 501.

Figure 6:
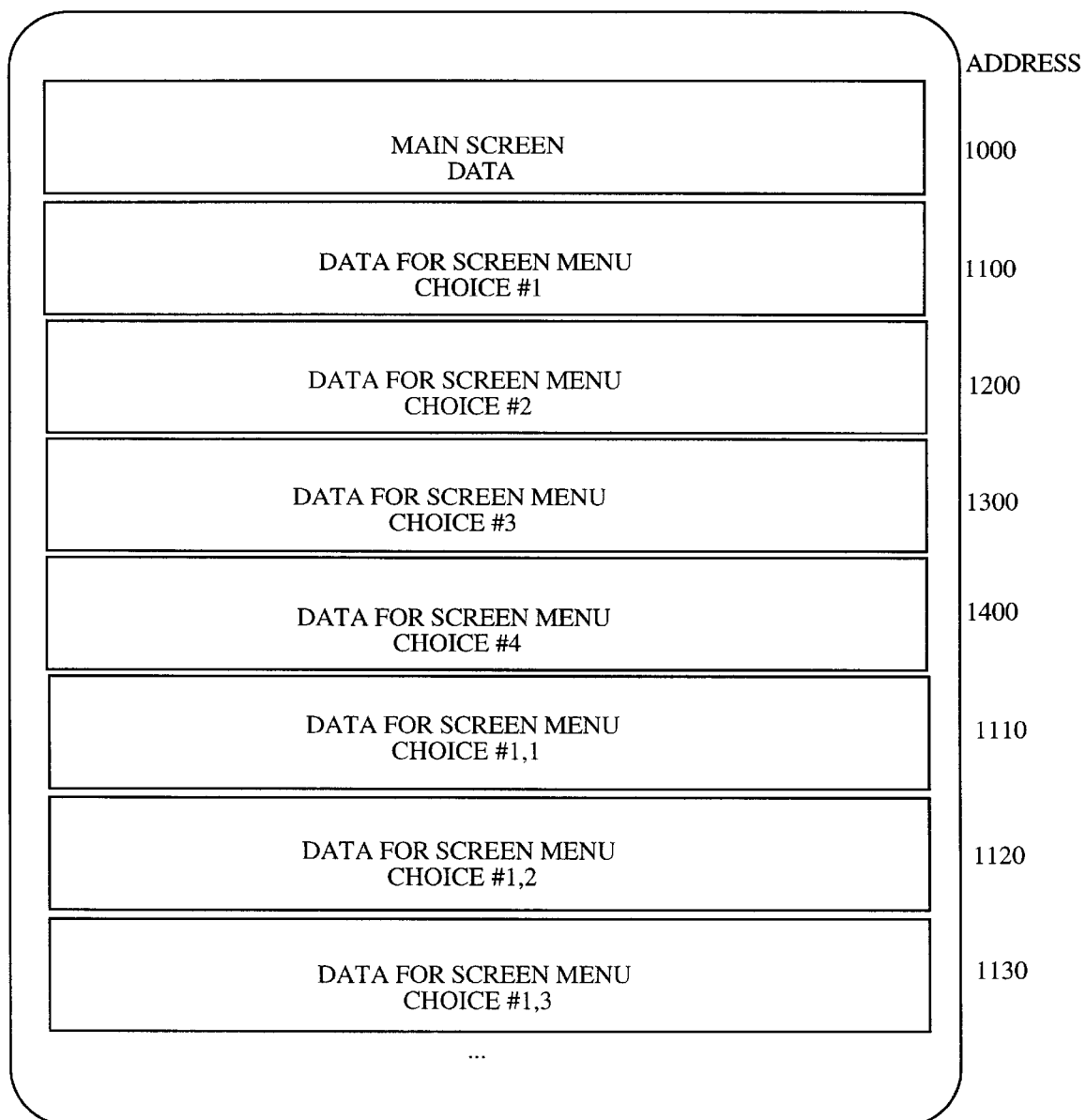
FIG. 6 illustrates memory addresses for data storage and retrieval, in accordance with the present invention.
Figure 8:
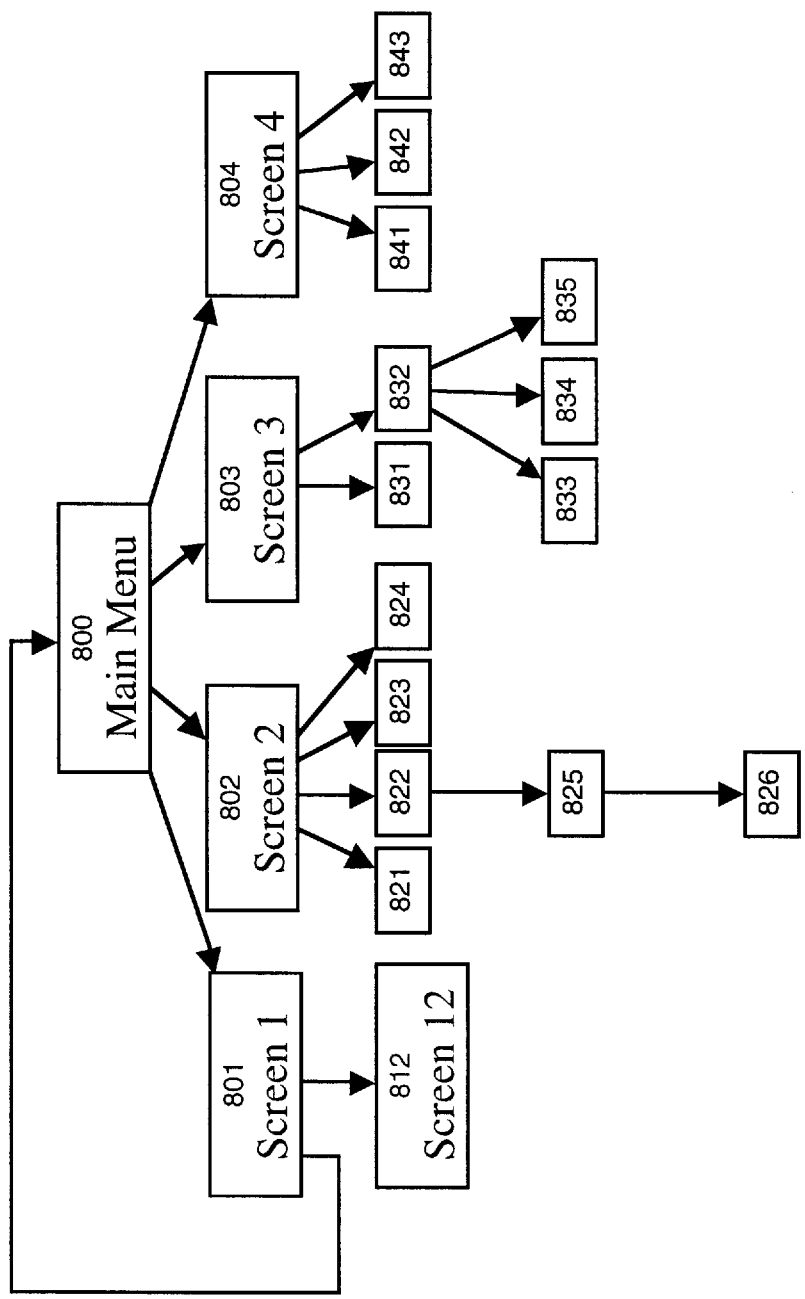
FIG. 8 illustrates receiver screen menu hierarchy, in accordance with the present invention.

Referring now to FIG. 6, there is shown a memory map 600 for screen data in accordance with the present invention. Data for a main screen menu are given the highest address, in this case 1000. Data for screens corresponding to main screen menu choice numbers 1 through 4 are stored at addresses 1100–1400, respectively. Data for screens corresponding to menu selections from the screen data addressed at 1100 are stored at locations 1110 through 1130, and so on. Thus, addresses for screen data are defined such that the most significant bits of an address identify the parent screens corresponding to a screen of data. Referring now also to FIG. 8, this hierarchy of screens may be thought of as a pyramid, with the main menu screen of data 800 appearing at the tip of the pyramid and with the pyramid of screens broadening out as moves down through the menus of screens, e.g., 801–804. The memory map 600 of FIG. 6 does not list addresses in numerical order, but in correspondence with this menu hierarchy. This menu hierarchy also determines which data are transmitted first once a new program material selection is broadcast. Data for the initial menu screen 800 (e.g., data with address 1000) are broadcast first, then data for the menu screens 801–804 directly accessible from that menu screen (e.g., data with addresses 1100, 1200, 1300), then data for menu screens, e.g., 812, accessible from those menu screens (e.g., data with addresses 1110, 1120, 1130) and so on through the hierarchy. In this manner, the user will have data that are higher in the hierarchy available more quickly than if the data were transmitted strictly in order of the addresses. Data for the main screen 800 are sent first and repeated relatively often, while data for subsequent screens, e.g., 801–804, are sent next and are repeated less often.

Figure 7:
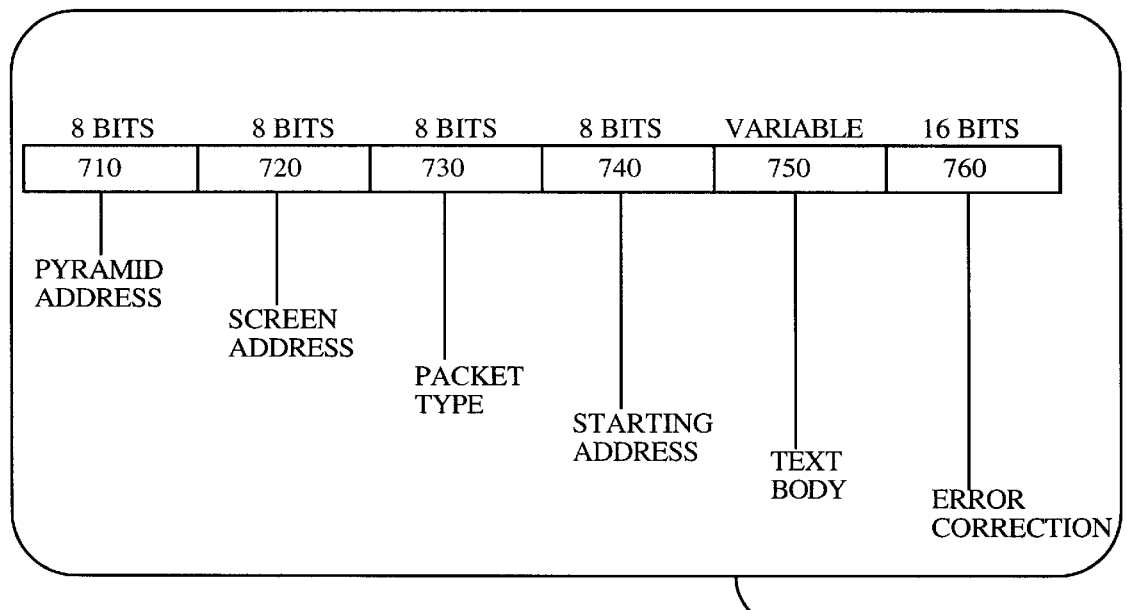
FIG. 7 illustrates the components of a data packet, in accordance with the present invention.

Referring now to FIG. 7, there is shown a data packet 700 in accordance with the present invention. To provide a flexible structure for presenting data on a receiver display, e.g., the display 300 illustrated in FIG. 3, data are transmitted in variable-length packets, e.g., 700. In a preferred embodiment, a packet 700 consists of several elements, the first of which is an eight bit pyramid address 710 identifying the data to be sent as corresponding to a particular selection of program material. Thus, if a musical selection is being broadcast, all data pertaining to that musical selection will have identical pyramid addresses. Next, an eight bit data segment is used for a screen address 720, to identify a particular screen of data. This address is used primarily for control purposes, so that when a user selects a new screen to view, an address is available to identify the data corresponding to that screen.

The following eight bit data segment serves as an identifier of packet type 730. A packet type 730 provides data indicative of whether the packet 700 is one providing screen text, one setting a parameter for such screen text (e.g., the font of the text), or one providing only control information (e.g., an address to jump to if a particular user selection is made from the current screen, or an action to take if no user selection is made within a particular "time-out" duration of time). In an alternate embodiment, one other packet type 730 might indicate that the data of that packet are to be used for drawing graphical images on the display 300. Following the packet type 730 is an eight bit starting address 740. In the case of packet types 730 indicative of text to be displayed on a screen, starting address 740 is used to provide a starting row and column on the display 300 for such text. In the case of packet types 730 used to control jumps to other addresses, starting address 740 is used to provide the address to be jumped to. Following the starting address is a variable length text body segment 750 containing text, if any, to be displayed on display 300. In a preferred embodiment, conventional techniques, such as a simple header, are used to indicate the length of the text body segment 750. Finally, a 16 bit error correction segment 760 is included in the packet 700 so that conventional error-checking methods may be used to validate the received data, as mentioned previously in connection with FIGS. 2 and 5.

In a simplified alternate embodiment, a fixed hierarchical structure may be used for the data and the display 300, thereby eliminating the need for variable-length packets 700. For instance, a "block" structure may be employed, in which each program material selection has, corresponding to it, a block of data of a fixed size. As a specific example, the menu structure may be three levels deep, with menus in each level except for the last providing three choices for subsequent menus. If each menu is constrained to a given number of text characters, then fixed addresses may be used for each screen of the hierarchy. Thus, while flexibility is sacrificed, increased data throughput is possible, since addressing of data is implicit in the structure and there is no need to transmit a unique address for each portion of data. Those of ordinary skill in the art may readily apply an appropriate data structure to the particular requirements of any system in accordance with the present invention.

Referring again to FIG. 8, there is shown a flow diagram of a menu hierarchy in accordance with the present invention. The menu hierarchy of FIG. 8 corresponds to the displays illustrated in FIGS. 3 and 4. In the diagram of FIG. 8, a main menu 800 provides the user with four choices for second-level screens 801–804. Screen 801 in turn provides the user with two choices for additional screens, one of which is main menu screen 800, and the second of which is a "Screen 12" 812. Screens 800–804 and 812 are shown using larger boxes to indicate that those screens are shown directly, or are indicated as possible screen selections, in FIGS. 3 and 4.

In the example of FIG. 8, other screen choices are available as well. For instance, "Screen 2" 802 provides four screen choices 822–824, and one of those choices, 822, provides yet another choice of a screen 825, which itself permits another choice, of screen 826. This structure may be used where information on a particular subject is so lengthy that three screens are required to present it.

Similarly, "Screen 3" 803 provides two choices 831, 832. Screen 832 also provides three choices, screens 833–835. "Screen 4" 804 provides three choices 841–843. Any configuration of screens may be employed for a given selection of program material, as suits the program material itself. The only limitations on such structure are transmission time for the data and available memory to store such data at the receiver. In an alternative embodiment, even if there is not sufficient memory to store all data in the hierarchy, a small "scratchpad" memory may be used to store user-requested data that are low in the hierarchy the next time it is transmitted. In such a manner, a very complex hierarchy may be used, without the need for large receiver data memory, but at the added cost of a potentially slower response time.

For purposes of clarity, FIG. 8 only illustrates one return path to main menu 800. It should be recognized, however, that in a preferred embodiment, every screen at the bottom of the hierarchy provides the user with a choice to return to a main menu 800. In addition, other screens may provide this choice as well, and may provide the user with the possibility of jumping directly to immediately preceding screens ("parents" in the hierarchy) or even to screens elsewhere in the hierarchy. The paths for navigation through the hierarchy are not fixed in any way, and may be different for each selection of program material (i.e., each musical piece).

Figure 9:
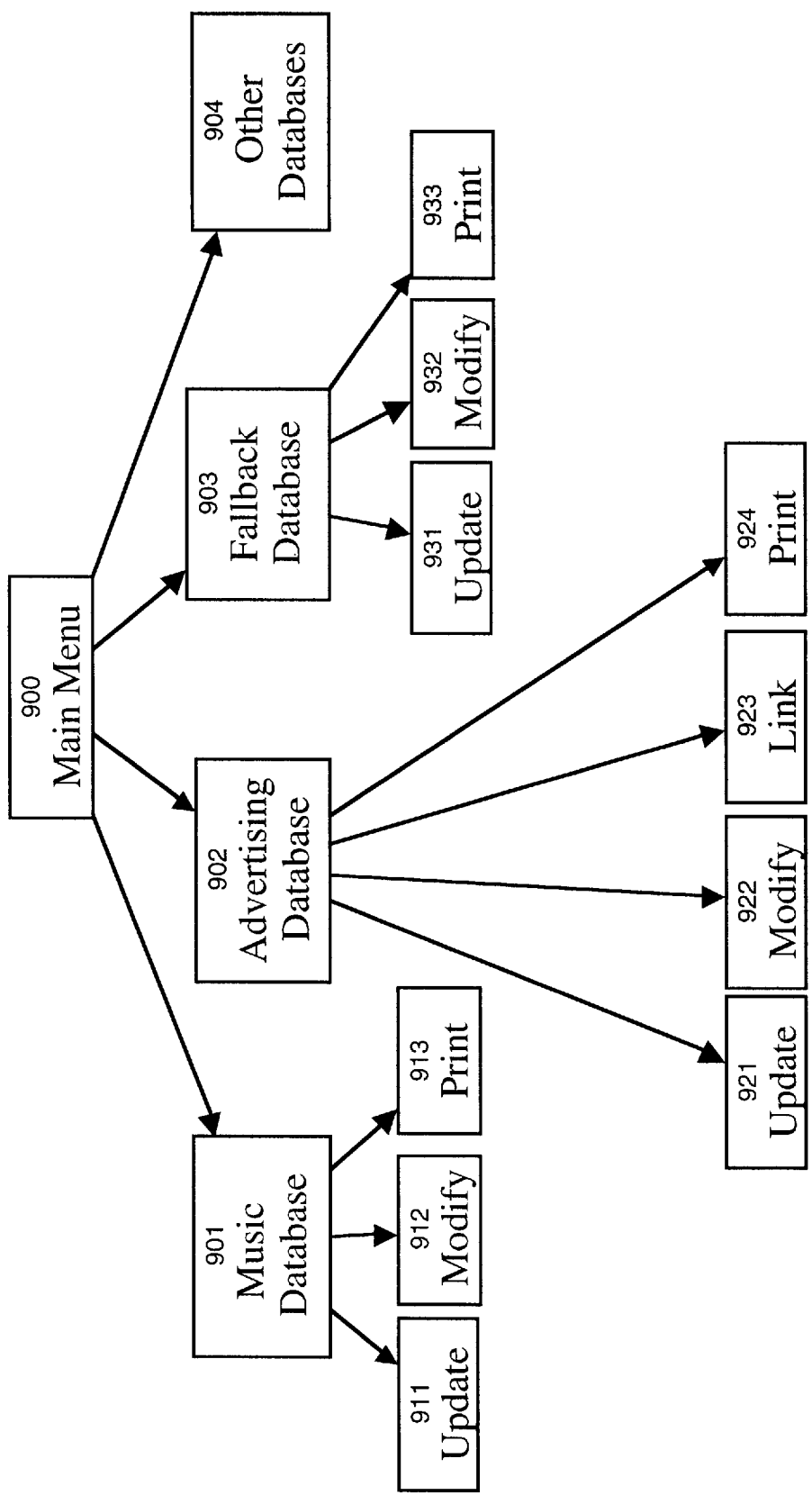
FIG. 9 illustrates screen menu flow for the programmer terminal illustrated in FIG. 1.

Referring now to FIG. 9, there is shown a diagram of menu choices available from programmer terminal 112 of transmitting system 100 illustrated in FIG. 1. As previously mentioned, programmer terminal 112 permits entry of data associated with programming material. In a preferred embodiment, a menu-driven user interface provides a flexible configuration for entering various types of data. A main menu 900 permits the programmer to choose operations concerning a music database, an advertising database, a fallback database, and possibly other databases. These databases are portions of screen storage database 156, discussed previously in connection with FIG. 1a.

A music database menu 901 provides the programmer with three choices for further operations. An update menu 911 allows the programmer to download music database updates, for instance information provided by a third-party database service. This information may be available on magnetic disk, optical disk, magnetic tape, or may be accessed through an on-line service. This information may typically contain an identification portion identifying a particular musical selection in a manner compatible with program material recognizer 106, and title and artist information of the sort described in connection with FIGS. 3 and 4 above. In a preferred embodiment, an existing database is merely updated by inputting new or changed information, but an entirely new database of information could also be downloaded in accordance with the present invention.

Modify menu 912 permits the programmer to change information that is currently in the music database. For instance, if there is a constraint on the amount of information that may be stored in transmitting system 100, modify menu 912 permits a programmer to delete information for musical selections for which such information is no longer required. For example, if a radio station changes the format of the music that it plays from classical to jazz, it may not be sensible to maintain classical information in the database. Programmers with greater constraints on storage space may even delete information on songs that are "stale" and will only be played rarely, if at all, in the future. Conventional techniques are used in modify menu 912 to allow a programmer to search for and select particular items for deletion.

Modify menu 912 also permits the programmer to add localized information to the database. Such information may include, for instance, the date, time and place of an upcoming local performance of a particular musical selection, or may be used to add information for selections that are not included in the general database downloaded using update menu 911. Conventional techniques are used to permit the programmer to customize any of the receiver screens, e.g., those displayed in FIGS. 3 and 4, to provide such localized information. In some circumstances, it may be desired to limit the ability of local stations to modify information for a particular selection, and conventional bit-switch techniques may be used to allow or deny such modifications. If local modifications are desired, these may supplement or replace the information downloaded using update menu 911. In cases where a programmer wishes to add information for a programming selection not included in the general database downloaded using update menu 911, the modify menu 912 also permits the programmer to record and store a "footprint" of the new programming selection so that it may be recognized by program material recognizer 106.

Print menu 913 permits the programmer to print various reports regarding the information that has previously been stored using update menu 911 and modify menu 912.

If the programmer selects the advertising database menu 902, the programmer may perform a number of operations relating to data that will be transmitted along with advertising program material. Update menu 921 provides functions similar to update menu 911 of music database 901. Update menu 921 may be used, for example, to load an advertising database with information that is to be transmitted along with particular commercial announcements. Modify menu 922 provides capabilities for adding, deleting and changing advertising information. In addition to the functions discussed in connection with the modify menu 912 of music database menu 901, modify menu 922 also permits the programmer to schedule dates for a particular advertisement to begin and end, so that the associated data may be added and deleted from a database of active advertisements as needed.

Link menu 923 provides the programmer with both internal and external linking capabilities. Exemplary of internal linking is a facility to permit advertising information to selectively be broadcast during particular program selections. For instance, if an advertiser is sponsoring a local performance by a musician, any program material selections by that musician might have associated with them messages from that advertiser. Exemplary of external linking is a facility to permit a conventional "traffic" software package that keeps track of advertisement schedules, rotations, and changes, to interface with the advertising database. As an example of the use of such external linking, when a traffic director deletes a completed advertising campaign, all of the information that was stored in the advertising database for that campaign will automatically be deleted.

Print menu 924 generates and prints reports concerning the advertising database as desired by the programmer. For instance, the programmer may request a report of all entries corresponding to advertisers having ad information that is to be transmitted during news broadcasts on the main (i.e., audio) channel.

If the programmer selects the fallback database menu 903, various operations may be performed on information that is to be transmitted when program material other than music or advertising is being transmitted or when the program material being transmitted is not recognized by program material recognizer 106. For example, one fallback choice would be transmitting the station's call sign, location, and logo, or the current time. Another might be a rotating set of messages regarding upcoming programs. As a further example of use of the fallback database, if program source detector 108 described in connection with FIG. 1 determines that a "sports microphone" is the currently selected device, current sports standings or statistics stored in the fallback database may be transmitted for display on a user's receiver display panel 300. Update menu 931 permits the programmer to download new information for this database in a manner similar to that described in connection with update menus 911 and 921. Modify menu 932 permits the programmer to make further additions, changes, or deletions to this database, and is similar in operation to the facility described in connection with modify menus 912 and 922. Print menu 933 allows the programmer to generate and print reports concerning the contents of the fallback database, and is similar to the print menus 913 and 924 previously described.

If the programmer selects the other databases menu 904, various operations may be performed concerning any other databases supported by the transmitting system 100. One example of such other databases is a schedule for upcoming advertisements or promotions. Another database might be a horoscope database for transmission of astrological information at pre-set times regardless of what program material is being transmitted. Yet a third example of a database accessible through the other databases menu 904 is information for an automated interactive listener call-in fax service, in which a listener uses the telephone handset of a fax machine to request facsimile printouts of information corresponding to recently transmitted program material. This last database might provide listeners not having receivers with associated data capability, e.g., receiver 200, with a mechanism to obtain similar information about program material selections.

In an alternative embodiment, the system illustrated in FIGS. 1 and 2 may also be used to provide personal messages to users. A personal identification code may be stored in data memory 203 or in other available memory within receiving system 200. This identification code may be entered by the user or may be predetermined, for instance by using a serial number for receiving system 200 as the identification code. A radio station operating the transmission system 100 may include in the associated data provided by data stream generator 105 a personal message (e.g., a song dedication or a promotional prize announcement) to a listener using known information as to the personal identification code stored in that listener's receiving system 200. User interface apparatus 206 performs a simple check to see whether such any such personal messages received have matching personal identification codes, and permits display (or output to card recorder 207) of only those personal messages where such a match is detected. One application of such a facility is to allow listeners calling the radio station to request personal dedications to their loved ones who may be listening at another location. In another application, stations themselves can offer promotional prizes through electronic coupons to only those listeners who have pre-registered their identification codes and are listening when it is announced that a listener's prize coupon is available for recording on a data card.

In a second alternate embodiment, an associated data capability may be added to video programming material. For example, a menu screen might appear as an inset to a television picture, and the user might be given a choice to receive data concerning the soundtrack of a motion picture that is currently being viewed. Similarly, a conventional pointing device, or "mouse" might be available for the user to select portions of a video picture for which the user might desire additional information. Thus, if a fashion model is displaying clothes, jewelry and a particular hairstyle, the user might position the cursor on a piece of jewelry and then click the pointing device to obtain a description of the jewelry and information on how to order it.

In yet another alternate embodiment, the data associated with the programming could be data corresponding to a software computer program. For instance, a television or radio station could transmit an entire software program to the user during a particular segment of audio/video programming. That software may or may not be directly associated with the audio/video programming being sent, but would typically be of interest to one interested in that audio/video programming. As one specific example, a station might transmit, along with a children's cartoon, game software for a home entertainment computer including the same characters as in the cartoon. The software may be transmitted gradually throughout the audio/video program, or even during commercial breaks, to give the user an incentive not to change stations during the data transmission. In another aspect of this embodiment, stations may transmit software in small portions throughout the broadcast day, either to individual groups or to all listeners/viewers, thus providing a further incentive for such listeners/viewers to stay tuned to the station. This software downloading capability could also be employed to provide updated system software for use directly by receiver 200, or could alternatively be employed to download software completely unrelated to the audio/video program material being transmitted by the station.

In yet another alternate embodiment, information such as a winning lottery number may be transmitted, either along with audio/video programming relating to the lottery drawing or at other times. A simple memory configuration in the user's receiver could store such information, either for later manual review by the user or for automatic comparison against the user's previously entered lottery number selections.

Figure 10:
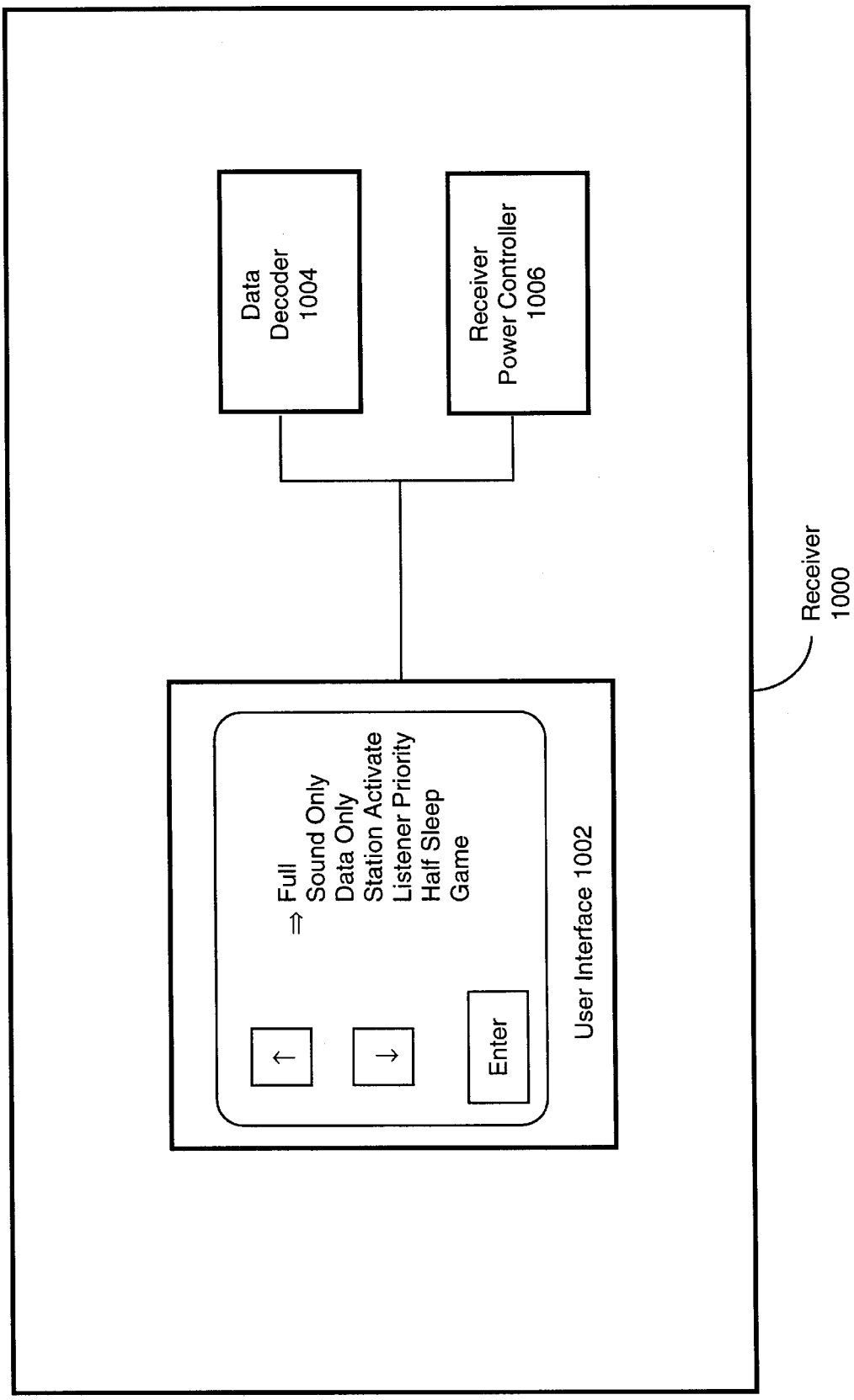
FIG. 10 is a block diagram for a receiver that operates in various modes to selectively receive, process and reproduce portions of transmitted program material and data, in accordance with the present invention.

Referring now to FIG. 10, there is shown a receiver 1000 capable of operating in multiple modes, in accordance with the present invention. Rather than having a single mode in which program material and associated data are always received and processed, receiver 1000 allows user selection of various modes of operation. By appropriate selection of a menu entry using user interface 1002, a user may select one of several modes of operation. In the example illustrated in FIG. 10, seven modes are available. The "Full" mode corresponds to operation as described above in connection with FIG. 2, in which receiver 100 provides both audio output and display of associated data. A "Sound Only" mode ignores the associated data and makes receiver 1000 operate as a conventional audio-only radio receiver. A "Data Only" mode mutes audio output from receiver 1000 so that it functions solely as a data receiver, storing and displaying data as described above in connection with FIG. 2.

A "Station Activate" mode similarly mutes audio output while maintaining data reception, but reactivates audio output upon receipt of predetermined associated data from a transmitting station. For example, receiver 1000 is configurable so that when it is in station activate mode, it will mute audio until such time as it receives data indicating that an emergency message is to be transmitted, at which time it will reactivate audio output for the duration of the emergency message.

A "Listener Priority" mode similarly mutes audio output while maintaining data reception, but permits listener selection of the types of data that will result in audio output reactivation. For example, in a preferred embodiment user selection of the "Listener Priority" mode results in display of a submenu listing "Weather," "Traffic," "Financial," "Sports," and "News Headlines." The user may select one or more of these categories. Before transmitting program material in any of these categories, a transmitting station transmits a corresponding data signal that, when received, causes the audio output of receiver 1000 to be reactivated. In alternative embodiments, data corresponding to each of these categories is transmitted in addition to, or instead of, the program material. In this embodiment, receiver 1000 stores and/or displays, at the user's selection, data received in each of the selected categories. In still another embodiment, data and/or program material are categorized by their importance, e.g., "5-star" (most important) to "1-star" (only moderately important). In this embodiment, the user selects a level of priority for which reactivation of audio output or storage of data is desired. For example, if the user selects "3-star," then any program material having an importance of "3-star" or higher will be provided as audio output, or alternatively all data of "3-star" or higher priority will be displayed and/or stored. Thus, the user is provided with a great deal of flexibility in determining the type and amount of information to be provided by receiver 1000.

A "Half-Sleep" mode causes the receiver 1000 to continue to receive and store data as in "Data Only" mode, but such data are not displayed. This mode may be selected when power consumption is a critical issue.

A "Game" mode is similar to the "Half-Sleep" mode, except that the only data stored is transmitted game data for use as described below in connection with FIG. 11.

Referring still to FIG. 10, user interface 1002 is coupled to data decoder 1004 so that the menu selections made via user interface 1002 may control the operation of data decoder 1004. Depending on the mode selected by the user, data decoder 1004 will either be inactive or will filter incoming data for the types of data described in connection with each of the modes discussed above. Receiver power controller 1006, coupled to data decoder 1004, receives control signals from data decoder 1004 and controls audio, data, and display circuitry of receiver 1000 in the manner discussed above for each of the selected modes. For example, if the user has selected the "Station Activate" mode of operation, data decoder 1004 examines incoming data for a predetermined data set corresponding to a transmitting station desiring to activate receivers, e.g., 1000, that are in this mode. When such a data set is decoded, data decoder 1004 sends a signal to receiver power controller 1006, and receiver power controller 1006 in turn activates the audio output from receiver 1000.

In a preferred embodiment, user interface 1002 is implemented by user interface apparatus 206 of FIG. 2, and data decoder 1004 and receiver power controller 1006 are implemented by microprocessor 204 of FIG. 2.

Figure 11:
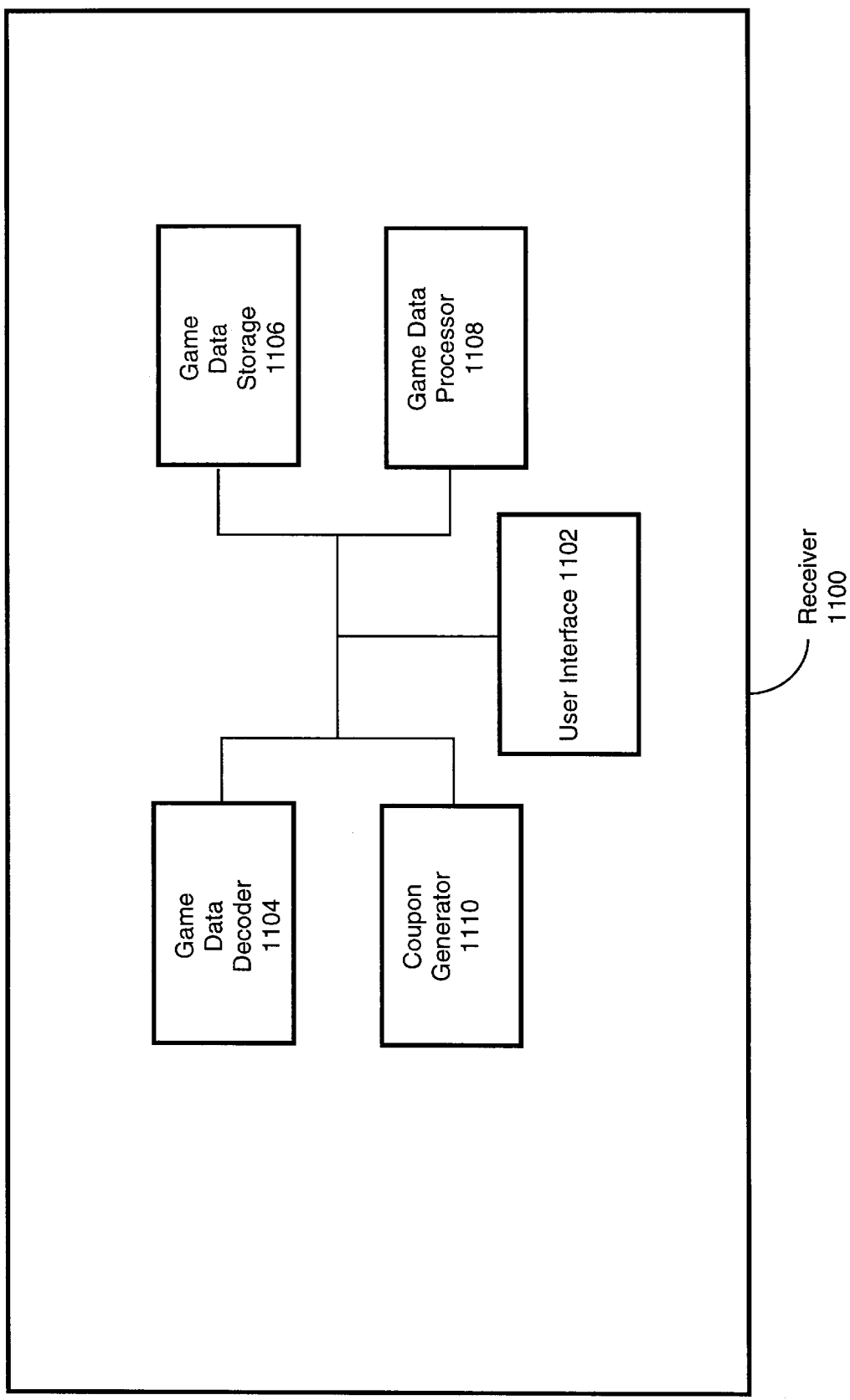
FIG. 11 is a block diagram of a receiver that includes a game-playing mode processing transmitted game-playing data, in accordance with the present invention.

Referring now to FIG. 11, there is shown a receiver 1100 that includes a game playing mode processing transmitted game-playing data, in accordance with the present invention. Data transmitted a s discussed in connection with FIG. 1 may include data for playing various types of games. As an example, a transmitting station may transmit data representing bingo cards and numbers, and data for card games such as poker, blackjack, and the like. As an incentive for listener loyalty, potentially "winning" data may be transmitted at various times during the day. If a receiver 1100 is tuned to the station, the winning data may be received; if not, the winning data will not be received. If a receiver 1100 is tuned in to a particular station long enough to receive winning data, a coupon may be generated, either electronically or in hard copy, that the user may remit for prizes, discounts on merchandise, or other benefits.

Specifically, receiver 1100 includes a game data decoder 1104 that filters incoming data searching for game-related data. Such data are, for example, identified by a predetermined data header. Such data are decoded by game data decoder 1104 and stored in game data storage 1106, all under the control of game data processor 1108. If game data processor 1108 determines that winning data are stored in game data storage 1106, game data processor 1108 directs coupon generator 1110 to issue a coupon that the user may redeem for a prize. User interface 1102 allows the user to interact with the game data, if desired, informs the user of the game results, and is also capable of displaying coupons, as is discussed below in connection with FIG. 13.

In one embodiment, a transmitting station transmits data representative of a bingo card every morning. During the day, the station transmits data representative of bingo numbers. Both the card data and the number data are stored in game data storage 1106. If, during the day, sufficient portions of the number data match the card data (as in the ordinary bingo game), the user is a winner and a co upon is issued. In one variation on this embodiment, the user selects from various cards transmitted at the beginning of the day, using user interface 1102.

In still another embodiment, the user or the transmitting station selects a particular card game by user interface selection or transmitted data, respectively. The transmitting station periodically transmits data representative of dealt cards, which the user of receiver 1100 either accepts for storage in game data storage 1106 via user interface 1102 or ignores. If the user selects a set of cards that represents a winning hand in the selected game, as determined by game data processor 1108, then game data processor 1108 directs coupon generator 1110 to generate a prize coupon. It should be recognized that numerous other games, such as roulette and slot machine, may be implemented in this manner.

In a preferred embodiment, game data decoder 1104 and game data processor 1108 are implemented by microprocessor 204 of FIG. 2, game data storage is implemented by data memory 205 of FIG. 2, user interface 1102 is implemented by user interface apparatus 206 of FIG. 2, and coupon generator 1110 is implemented by microprocessor 204 and either data card recorder 207 or user interface apparatus 206 of FIG. 2, as described in greater detail below in connection with FIG. 13.

Figure 12:
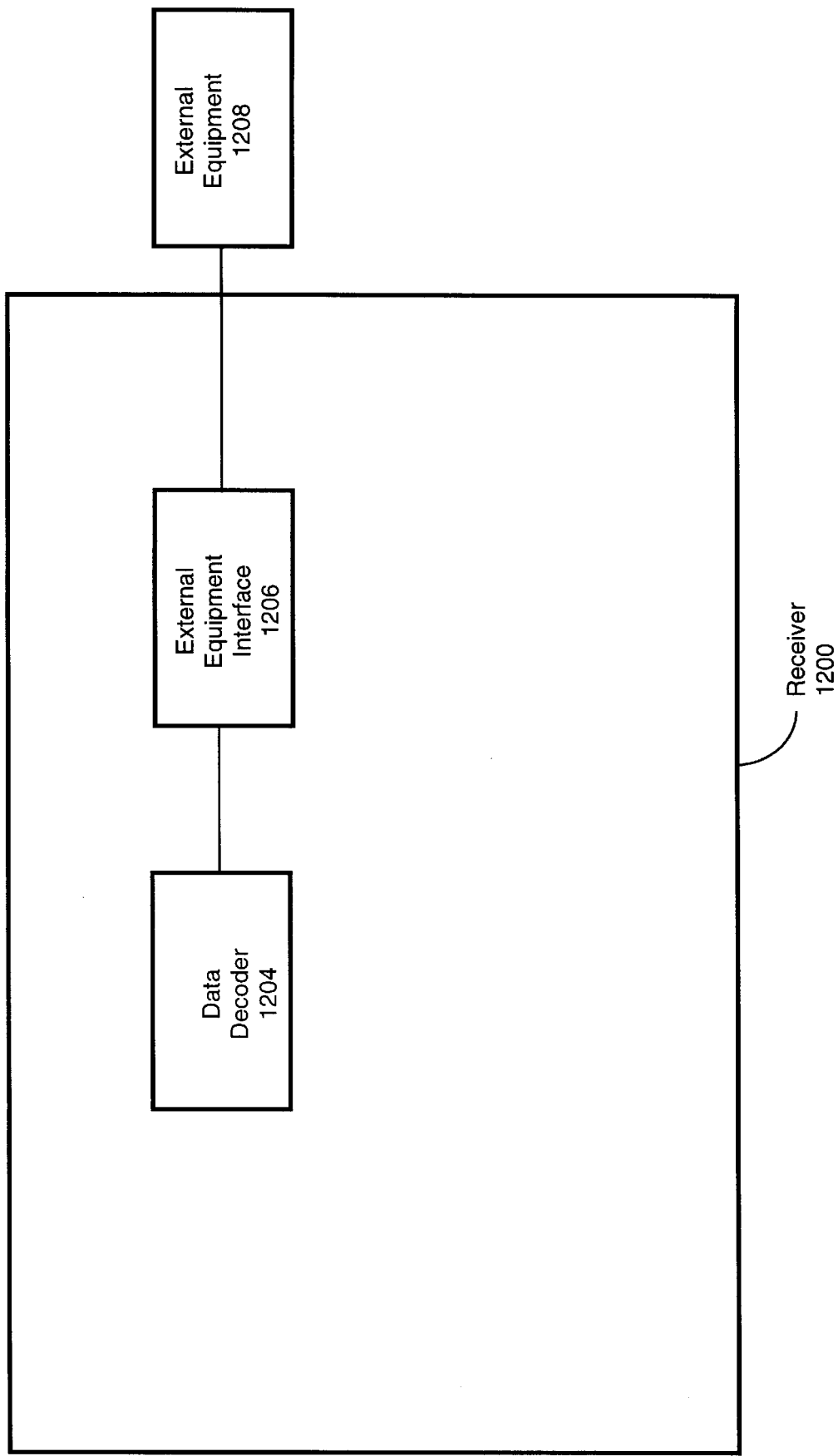
FIG. 12 is a block diagram of a receiver that generates signals to control connected devices based on transmitted data, in accordance with the present invention.

Referring now to FIG. 12, there is shown a receiver 1200 configured to control external equipment 1208 based on transmitted data, in accordance with the present invention. In one embodiment, receiver 1200 includes a data decoder 1204 that examines a received stream of data searching for a predetermined type of data. One such type of data corresponds to the acoustic properties of the program material being broadcast, such that lights, bells, chimes, and other annunciators may be activated in synchronism with the program material. A simple example is one in which data corresponding to the tempo and volume of the program material is transmitted, such that by use of external equipment interface 1206, external equipment 1208 comprising decorative lights may be energized in a manner corresponding with the program material. In this example, for instance, the lights of a Christmas tree could be controlled in correspondence with transmitted Christmas music program material. Similarly, specialty dance floor lighting and even "smoke" machines may be triggered by such data in correspondence with transmitted dance music program material. In yet another example, a "bouncing ball" display with or without displayed lyrics can be made to move along with the lyrics of transmitted vocal program material. In still another example, data to drive a conventional electronically-actuated piano or other instrument is transmitted along with program material, so that the listener may hear a "live" piano performance with background music or vocals from the audio output of receiver 1200.

In a different embodiment, receiver 1200 is installed in an automobile. Data decoder 1204 is configured to examine received data for a unique data set corresponding to the serial number or other identifying number of receiver 1200 or the automobile in which it is installed. In this embodiment, if the automobile in which receiver 1200 is installed is ever stolen, the owner may request a transmitting station to broadcast the unique data set. Upon decoding the unique data set, data decoder 1204 provides a signal to equipment interface 1206 to control external equipment 1208, such as the lights, horn, electric door locks, and ignition of the automobile, in an appropriate manner. In one variation of this embodiment, receipt of the unique data set by receiver 1200 can result in the automobile's lights flashing, the horn sounding, the doors locking, and the ignition being disabled.

Figure 13:
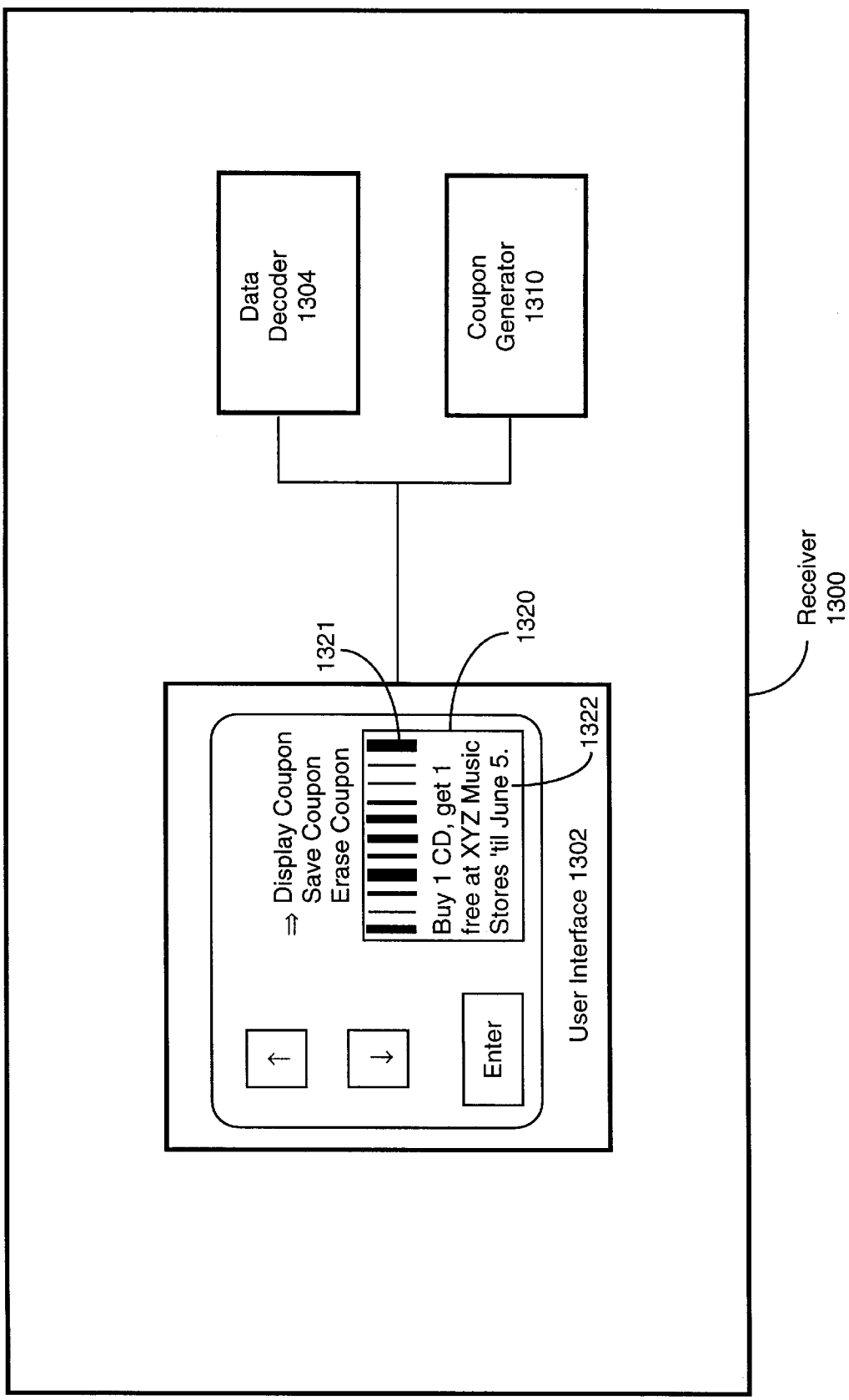
FIG. 13 is a block diagram of a receiver that produces a scannable bar code based on transmitted data.

Referring now to FIG. 13, there is shown a receiver 1300 that produces a scannable bar code 1321 based on transmitted data, in accordance with the present invention. As mentioned above, it is desirable in a variety of applications to produce coupons that the user may redeem at vendor locations for prizes, discounts, and other benefits. One way to produce such coupons is through use of a data card recorder 207, as described in connection with FIG. 2. Another way to produce electronic coupons is to display on user interface 1302 a bar code 1321 that may be scanned using conventional bar code reader apparatus.

In one embodiment, a data decoder 1304 examines received data searching for a predetermined type of data representing an electronic coupon. For example, while a transmitting station broadcasts program material from a particular compact disc, the station may also broadcast data representing an electronic coupon providing a discount for purchasing that disc from a particular vendor. When such data are decoded by data decoder 1304, data decoder 1304 directs coupon generator 1310 to generate a corresponding electronic coupon. In the embodiment illustrated in FIG. 13, coupon generator causes user interface 1302 to display a coupon 1320 including a conventional bar code 1321 and a text message 1322. User interface 1302 provides the user with the option of displaying the coupon and saving the coupon. Also, a menu selection for erasing the coupon is provided, so that the vendor can erase the coupon after it has been scanned. In a preferred embodiment, user interface 1302 provides a liquid-crystal display on which coupon 1320 may be shown and which is of sufficient quality and contrast to permit bar code scanning. In operation, the vendor may scan not only the bar code 1321 provided by user interface 1302, but may also scan or otherwise record information identifying receiver 1300. Such information may be obtained by presentation of another bar code, carrying the serial number of receiver 1300, on user interface 1302, or may be obtained by a conventional printed bar code or serial number on the back or bottom of receiver 1300. By collecting coupon and receiver information at the same time, the vendor or third parties may compile customer profile and demographic information that may be useful for marketing or other commercial purposes.

Figure 14:
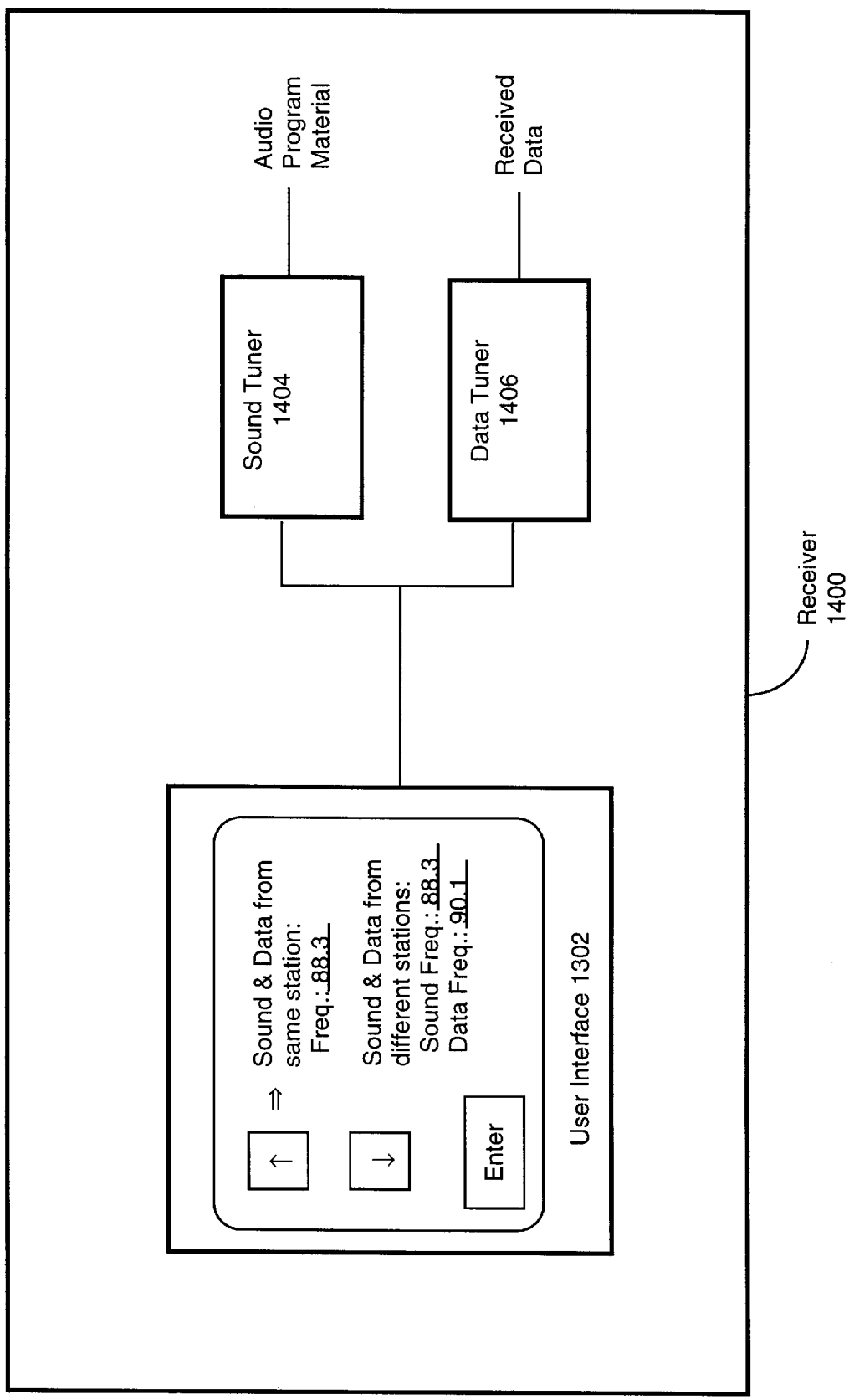
FIG. 14 is a block diagram of a receiver that includes multiple tuner subsystems for selectively receiving more than one channel of program material and transmitted data, in accordance with the present invention.

Referring now to FIG. 14, there is shown a receiver 1400 that includes multiple tuners for selectively receiving more than one channel of program material and transmitted data, in accordance with the present invention. In some situations, users may prefer the program material of one station and the data of another station. Therefore, rather than requiring the user to switch between such stations, receiver 1400 includes a sound tuner 1404 and a data tuner 1406 that permit receiver 1400 to provide audio program material from a first station and data from a second station. User interface 1302 permits a user to select whether sound and data are to be received from a single station or from separate stations. In one variation of this embodiment, sound tuner 104 is used for both audio and data in this mode. In another variation, sound tuner 104 and data tuner 1406 are merely tuned to the same frequency in this mode. Conventional user interface techniques permit the user to single-station or dual-station mode, and to enter the desired frequencies. Thus, if a user prefers the music programming of a first station, but wishes to receive electronic coupons from a second station as discussed in connection with FIG. 13, receiver 14 permits such operation.

Figure 15:
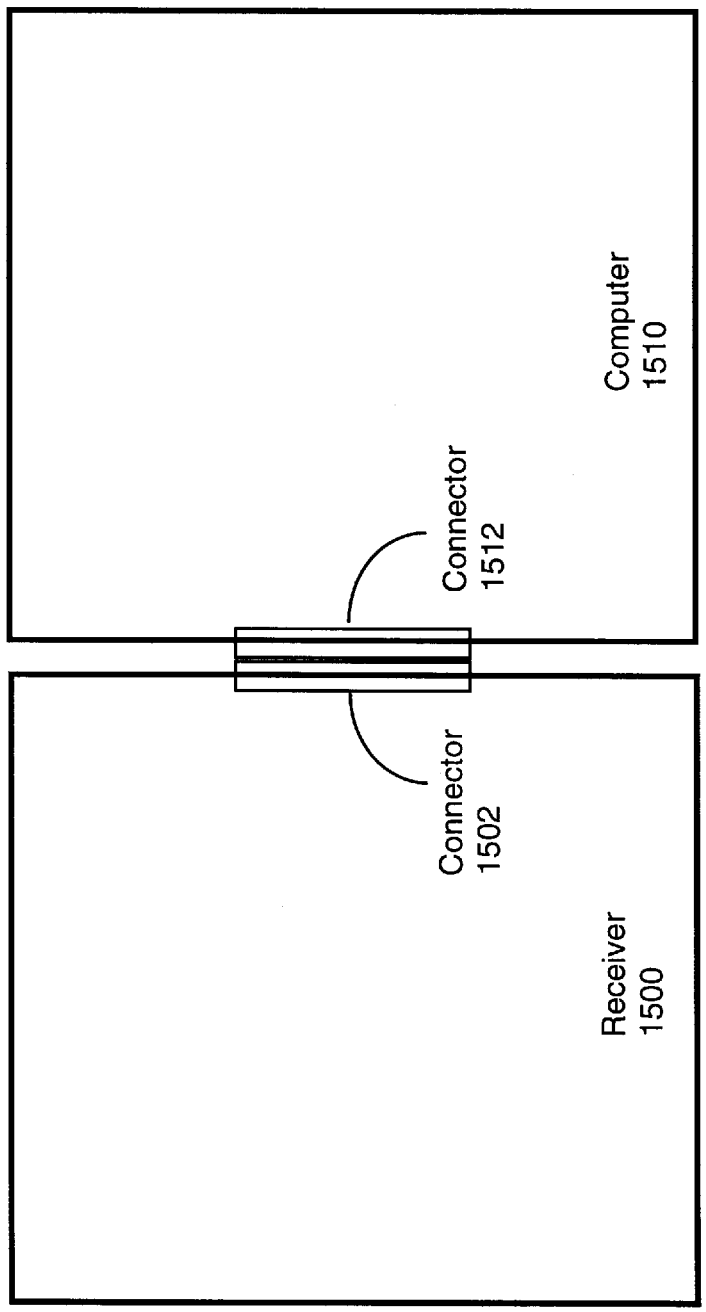
FIG. 15 is a block diagram of a system including a receiver and a connected computer system controlled responsive to transmitted data, in accordance with the present invention.

Referring now to FIG. 15, there is shown a system including a receiver 1500 and a connected computer 1510 that is to be controlled responsive to transmitted data, in accordance with the present invention. Connectors 1502 and 1512 electrically connect computer 1510 and receiver 1500. It should be recognized that other means of coupling computer 1510 and receiver 1500, such as an infrared or other wireless link, could also be used. Connected in this manner, computer 1510 can display and process data received by receiver 1500. For example, receiver 1500 and computer 1510 may be configured so that important news, weather, or traffic information received as data by receiver 1500 flashes on the screen of computer 1510. If receiver 1500 or computer 1510 is equipped with a modem, the user may enter transactions with a remote site based on received data. For example, if received data provides the name of a compact disc on which the current program material is found, computer 1510 may be configured to automatically dial to a remote location to place an order for that compact disc, which can then be sent to the user by mail.

In an alternate embodiment, the data received by receiver 1500 may be used directly by computer 1510. For example, the data may represent game data for use by computer 1510, computer programs for use by computer 1510 or even customized screen saver data for display by computer 1510 during periods that computer 1510 is not provided with user input. Such screen saver information may dynamically move on the display of computer 1510 with the program material being received by receiver 1500.

In still another embodiment, receiver 1500 may be configured in a foldable form, to allow ease of portability and use while still providing a form factor compatible for connection with computer 1510. It should be recognized that other convenient form factors and configurations of receiver 1500 and computer 1510 may be used, as may be desirable for any particular application.

Figure 16:
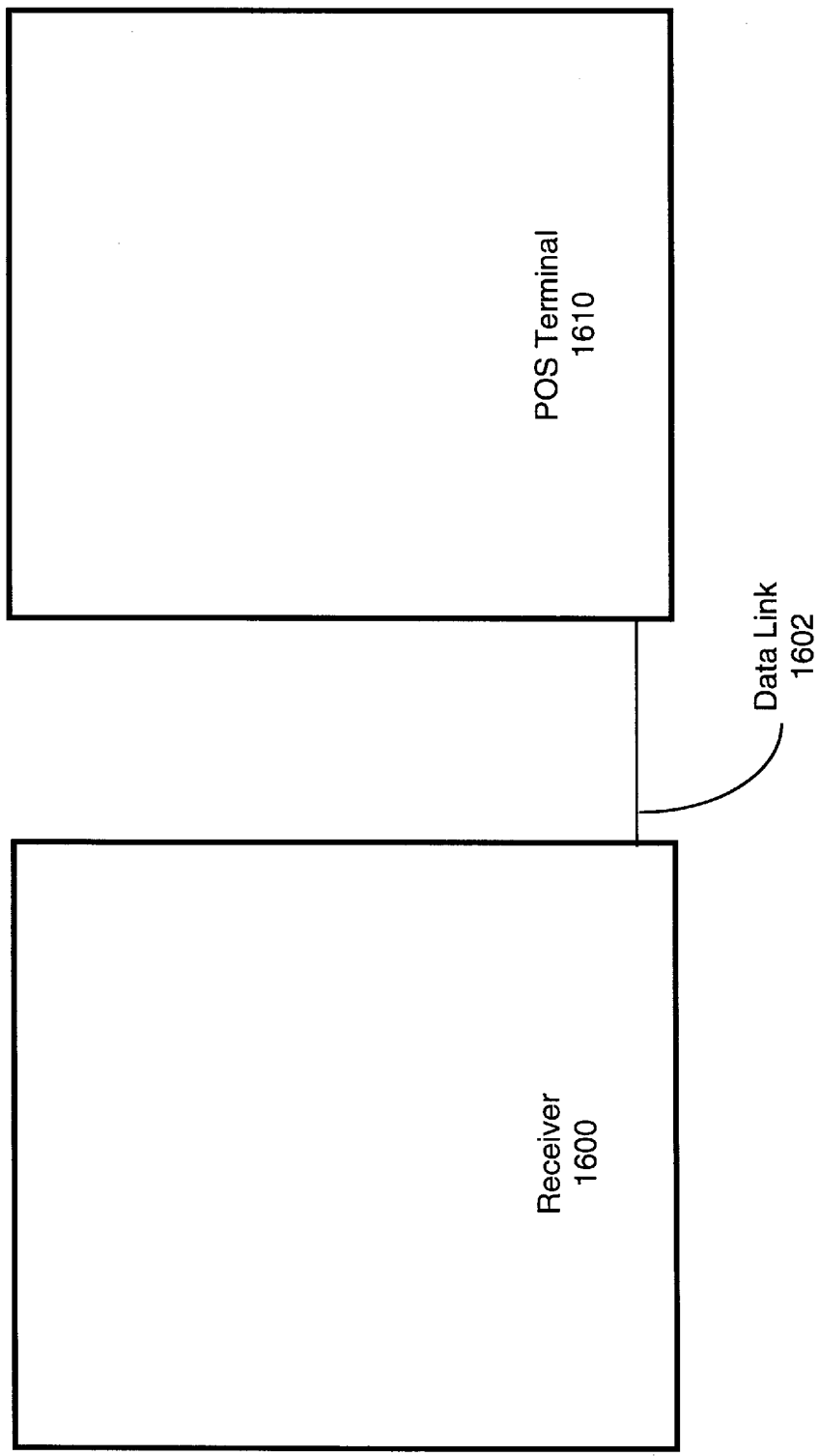
FIG. 16 is a block diagram of a receiver connected to a point of sale terminal using a data link, in accordance with the present invention.

Referring now to FIG. 16, there is shown a receiver 1600 connected to a remote point of sale ("POS") terminal with a data link 1602. In some applications, it may be desirable for a user of a receiver capable of receiving and storing program-related data to communicate with such a remote POS device. For example, it may be desirable for a user to have the capability for electronically redeeming coupons of the sort described above even if the user is remotely located from the establishment providing such coupon redemption. In such a situation, if receiver 1600 includes conventional interface circuitry, such as a modem for a telephone data link or an ethernet connection for a local- or wide-area network data link, a user may download such a coupon directly to a POS terminal at the coupon redemption location. In another application, the user may be provide with incentives (e.g., coupons) to download other information that may be stored in a memory of receiver 1600 using conventional techniques and apparatus. For example, market research reasons may call for information concerning the stations from which coupons were obtained, the types of information stored by the user, and the like to be provided to POS terminal 1610. As discussed above, in some embodiments each receiver 1600 is provided with a corresponding unique identifier, so through use of such a data link 1602, a POS terminal 1610 may accumulate information specific to a particular listener including the user's listening behavior (e.g., tune-in and tune-out times, number of stations tuned, program identity at time of tune in or tune out) and the user's data viewing and recording behavior (e.g., how often data are recorded, stations from which data are recorded, programs from which data are recorded, data recording times, which data screens are viewed but not recorded). It should be recognized that the implementation of such enhancements in the apparatus described herein, e.g., receiver 200, to result in such a receiver, e.g., 1600, is straightforward and well known. It should also be recognized that any of the various common data links, such as telephone modem links, local area network or wide area network links, or the like, may be readily applied to implement data link 1602.

Figure 17:
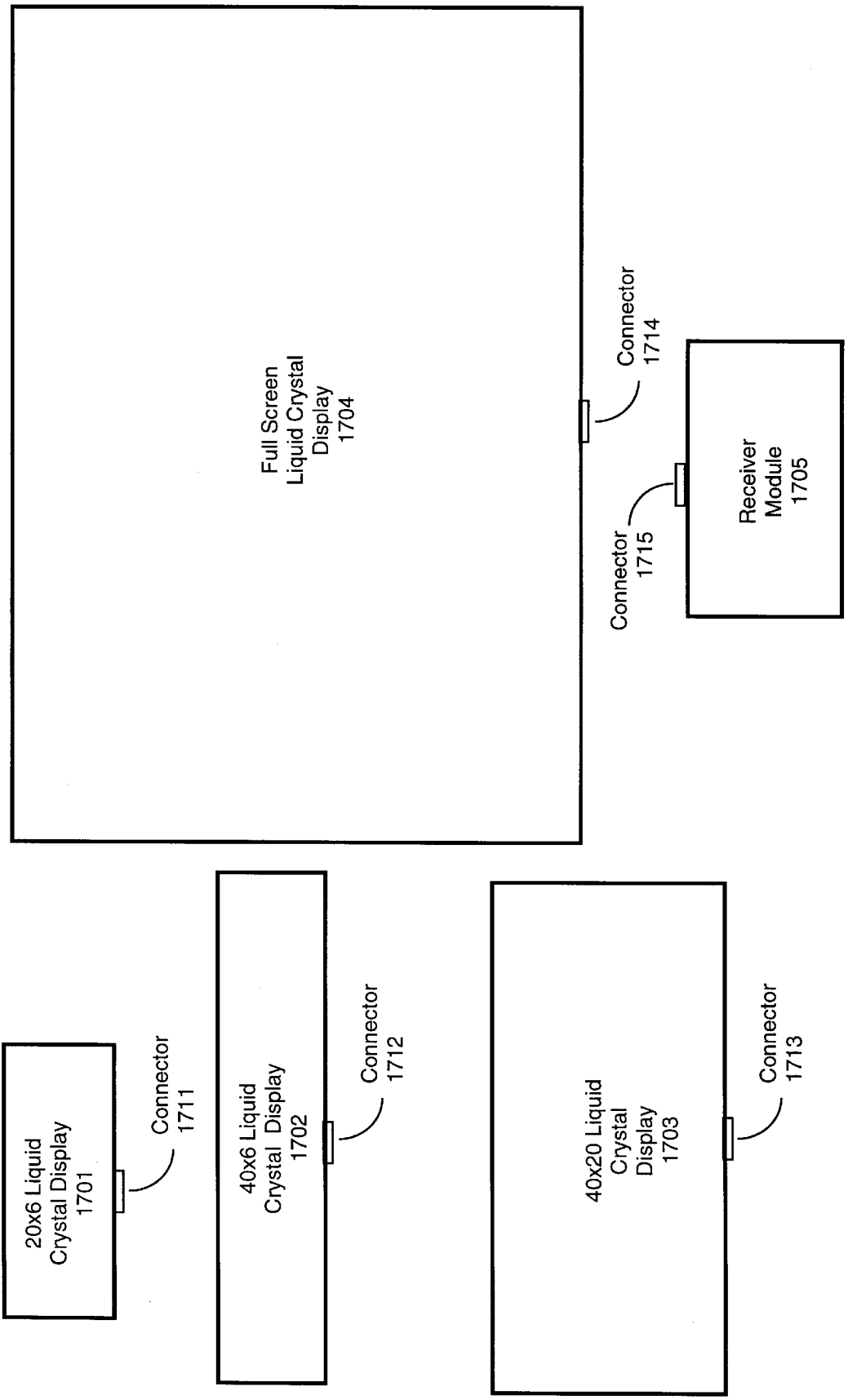
FIG. 17 is a block diagram of a receiver module and four different liquid crystal displays connectable to the receiver module, in accordance with the present invention.

Referring now to FIG. 17, there is shown an embodiment having a receiver module 1705 including a connector 1715, as well as four liquid crystal displays of various sizes 1701–1704, each having a connector 1711–1714. When receiver module 1705 is coupled to any of the displays, e.g., 1701, the resulting combination provides the functionality of receiver 200 described above. By providing a display, e.g., 1701 that is detachable from the remainder of the receiver electronics (receiver module 1705), a receiver module storing the user's pre-set stations, coupon information, and other data may readily be moved, for example, from a home location to automobile location to a portable device carried on the user's person. In a preferred embodiment, receiver module 1705 uses conventional techniques to automatically configure the signals it produces for driving a connected display in a manner most compatible with the size, configuration, and other characteristics of such display. For instance, when receiver module 1705 is connected to a large display, e.g., 1705, menu button areas such as 301–304 illustrated in FIG. 3 may be provided. On a smaller display, e.g., 1701, only the text corresponding to those buttons may be shown. By providing a user with a portable receiver module 1705 that may be moved from place to place with the user, the user may collect more desired data in one place than otherwise would be possible. In addition, more complete information about the user may be collected in the manner discussed in connection, for instance, with FIG. 16.

Figure 18:
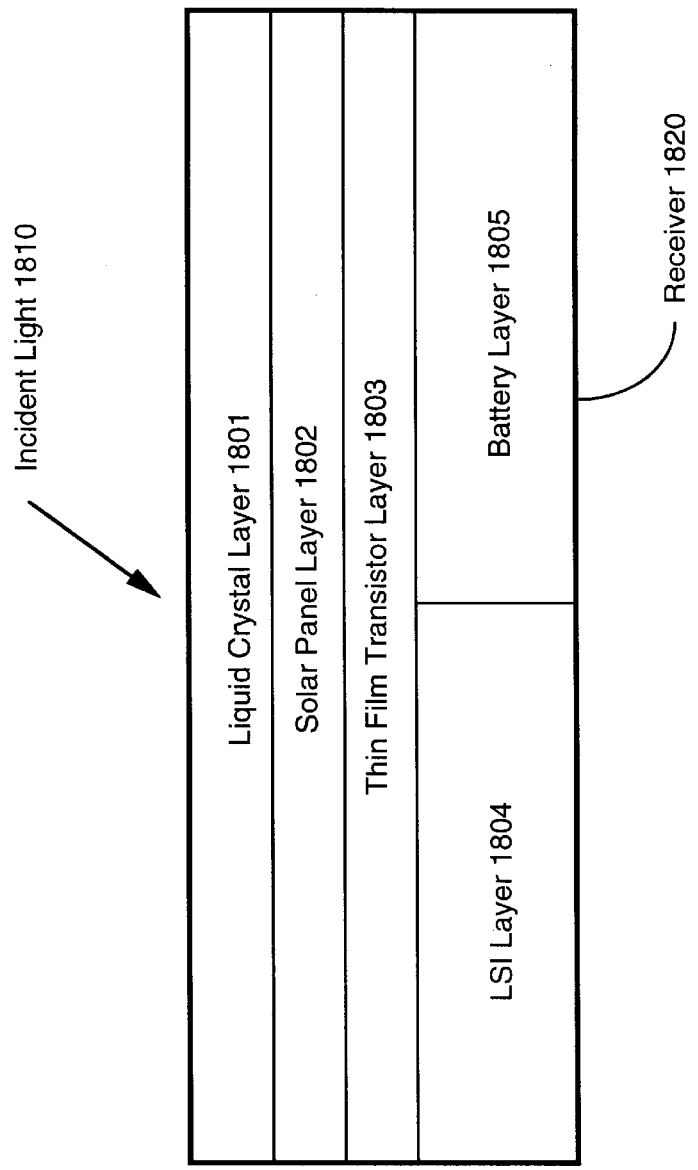
FIG. 18 shows a receiver having a solar panel integrated with a liquid crystal display, in accordance with the present invention.

Referring now to FIG. 18, there is shown a cutaway edge view of a portion of a receiver 1820. Receiver 1820 includes a liquid crystal unit, or layer, 1801 for providing display of information as discussed herein. Underneath layer 1801, receiver 1820 further includes a solar panel unit, or layer, 1802. Solar panel layer 1802 includes a conventional solar panel array that is used in a conventional manner to power receiver 1820 and to recharge batteries for receiver 1820. In typical usage, most of the display provided by liquid crystal layer 1801 remains clear rather than opaque most of the time. 25 Thus, virtually all of any incident light 1810 falling upon liquid crystal layer 1801 also reaches solar panel layer 1802. By integrating a conventional solar panel layer 1802 with a conventional liquid crystal layer 1801, receiver 1820 can be made physically smaller than if a solar panel unit and a liquid crystal display were disposed adjacent to one another.

In the embodiment illustrated in FIG. 18, a thin film transistor layer 1803 is disposed immediately below solar panel layer 1803. The remainder of the electronics comprising receiver 1820, including LSI layer 1804 and battery layer 1805, are disposed substantially underneath the thin film transistor layer 1803. It should be recognized that variations in the arrangement of these portions of receiver 1820 may readily be made while still obtaining the benefits of integrating a solar panel and a liquid crystal display. As an example, the thin film transistor layer 1803, as well as the LSI layer 1804 and battery layer 1805 may be located remotely from solar panel unit 1803 and liquid crystal layer 1801.

Alternatively, solar panel unit 1803 may be fabricated directly on one of the components of receiver 1820, for instance LSI layer 1804. Specifically, solar panel unit 1803 may be bonded to LSI layer 1804 or may even be constructed from the same substrate as used in LSI layer 1804, depending on requirements of maximum desired size and weight of receiver 1820.

It should be recognized that the readability of the display provided by liquid crystal layer 1801 may be affected by the color of solar panel unit 1803. Accordingly, liquid crystal layer 1801 and solar panel unit 1803 should be selected in a manner that provides reasonable contrast for typical viewing conditions.

Figure 19:
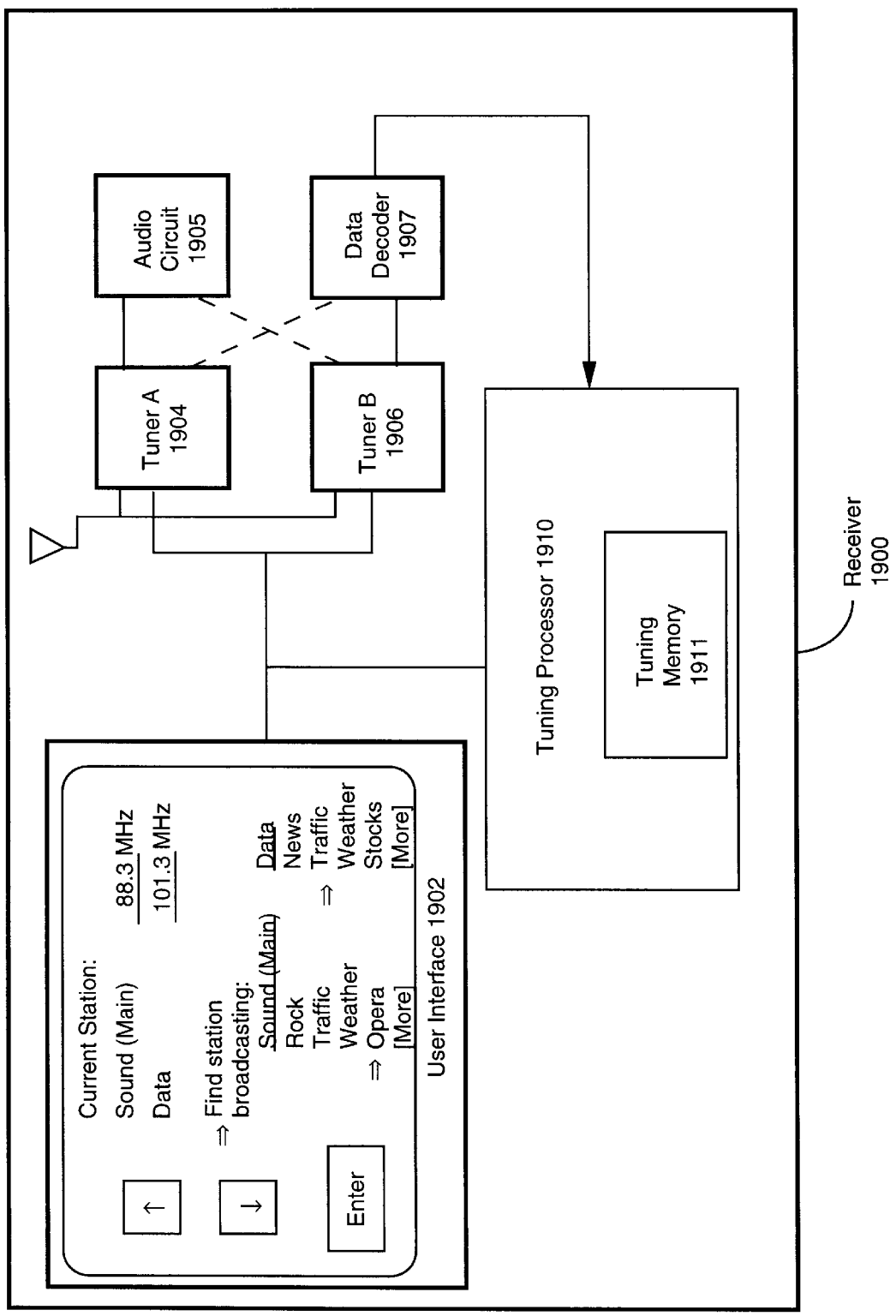
FIG. 19 is a block diagram of a receiver that includes two tuner subsystems for selectively tuning stations in response to transmitted data, in accordance with the present invention.

Referring now to FIG. 19, there is shown a receiver 1900 in accordance with the present invention. Receiver 1900 includes a tuner A 1904 and a tuner B 1906, each of which can be independently tuned to different frequencies. In normal operation, both tuner A 1904 and tuner B 1906 may be tuned to the same station, and operation as discussed above will be achieved. Typically, tuner A 1904 is coupled to audio circuit 1905 for audio reproduction of received program material, and tuner B 1906 is coupled to data decoder circuit 1907 for reception and processing of transmitted data. In certain applications where tuners 1904 and 1906 are tuned to different frequencies, it may be desirable to obtain data from the frequency to which tuner A 1904 is set, or to receive audio programming from the station to which tuner B 1906 is set, and receiver 1900 is configured to provide such operation, as indicated by the dashed lines connecting tuners 1904 and 1906 with data decoder 1907 and audio circuit 1905, respectively.

In another mode of operation, tuner A 1906 is used to provide information to receiver 1900 that is employed to change the tuning of tuner B 1904 as desired by the user. The other components of receiver 1900 making this possible are tuning processor 1910 with tuning memory 1911, and user interface 1902.

Specifically, in one particular mode of operation of receiver 1900, part of the data stream received by tuner B 1906 includes information on the types of programs being transmitted not only by the station to which tuner B 1906 is currently tuned, but by all other stations within the listening area as well. For instance, all of the broadcast stations in a particular geographic area might agree to share information on what they are broadcasting, and to transmit this information for all such stations in the data stream transmitted by each such station. As shown in FIG. 19, the data are applied from tuner B 1906 to tuning processor 1910 and may be displayed for the user's consideration by user interface 1902. If the user selects a particular type of program material different than that being broadcast by the currently selected station, a signal indicating the user's selection is generated by user interface 1902 to processor 1910, which in turn generates a control signal that is applied to tuner A 1404 instructing it to tune to the appropriate frequency. Typically, tuner B 1906 is directed to tune to the new frequency, but some applications may not call for the frequency of operation of tuner B 1906 to change. It should be noted that in a mode of operation where the data and sound programming are always obtained from the same frequency separate tuners are not required for sound and data, and receiver 1900 could be implemented using a single tuner for both sound and data.

In many environments, it is doubtful that broadcast stations would agree to share their programming data with competitive local stations. In these environments, each station may transmit only a description of the type of program material that it is currently transmitting. When this is the case, tuning processor 1910 instructs tuner B 1906 to scan the entire broadcast band for data transmissions indicating what type of program material is being transmitted by each station within receiving range. Tuner B 1906 and tuning processor 1910 are conventionally configured to provide interaction so that the program material description and the frequency for each such station is stored in tuning memory 1911. Then, as in the previous mode, this information is presented to the user via user interface 1902.

In still another environment, a single station in the area may be designated as the station to broadcast information as to what programming currently is being broadcast on all other stations. In this environment, tuner B 1906 tunes to that station, either by automatically scanning all stations until it finds one that identifies itself as broadcasting this information or by user command, and then provides the programming information to tuning memory 1911 and user interface 1902 as described above.

It should be noted that the description of programming provided by a station can be either generalized or extremely detailed. For instance, in one environment a station may simply indicate that it is broadcasting music, while in another the genre of music or even the particular song may be identified. Similarly, a station broadcasting sports programs may simply describe its programming as sports or may identify the particular sporting event being broadcast. Depending on uniformity of such data in a listening area, the user will be provided with greater or lesser detail by user interface 1902.

If more than one station in a broadcast area is transmitting a particular category of program material, such as "news", when the user selects that category tuning processor 1910 may be configured either to select one of the stations automatically or to provide the user with a choice via user interface 1902. For mobile applications, automatic selection based on signal strength may be appropriate, using conventional circuitry for signal strength determination.

In another embodiment suited for mobile applications, receiver 1900 may be configured to scan, using tuner B 1906, for other stations broadcasting the same type of program material if the signal strength of the currently tuned station falls below a minimum threshold. For example, if someone driving in an automobile is listening to an opera program on a public radio station and begins to get too far from that station to receive a clear signal, tuner B 1906 can identify other stations, e.g., from nearby cities, that may be transmitting the same program, as indicated by the received data from that station. In one implementation, the user need merely select the "opera" choice from user interface 1902 and the opera station with the strongest signal is chosen automatically. In another implementation, if the currently tuned station is broadcasting opera, when that signal becomes weak selection of a stronger opera station is made without any user intervention at all.

Furthermore, there may be environments where the user wishes to receive certain types of data that correspond to the audio programming on a particular channel. For example, the user may seek a station that is broadcasting both an audio report of traffic conditions and data providing a textual report of those conditions. If information about both audio programming and data programming are transmitted by broadcasting stations, receiver 1900 may be configured to allow a user to request such stations where both audio and data programming relate to a particular topic, such as traffic conditions. As discussed above, additional parameters such a signal strength may also be used to prioritize or select among multiple stations that may meet the user's criteria. Certain users may not even be interested, at any given time, in the audio programming of a station, but may be solely interested in the data being broadcast by that station. In such event, receiver 1900 may be configured to allow a user to request data tuner 1406 to be tuned to a station broadcasting a particular type of data, without regard to the programming being received by tuner A 1904.

When the user is interested in selecting stations based on the type of data being broadcast, there may be instances where the user seeks multiple types of information such as traffic, sports, and weather. To facilitate such operation, receiver 1900 is configurable to provide user interface selection of such multiple categories and to seek a station that is broadcasting all of the desired types of data.

If multiple such stations are found, they may be prioritized based on signal strength as described above, or based on other parameters. For example, the stations may broadcast data indicating how often they update or re-send certain types of data, such as sports scores and traffic conditions, and receiver 1900 may select among stations based on the one that provides the most frequent updates. Alternatively, tuner B 1906 may, through review of the data received from any particular station, keep track itself of how often data are changed for any particular category and thereby derive the same information.

If the user has selected multiple data types, but no single station is found that is broadcasting all such data types, receiver 1900 is configurable to selectively tune to stations broadcasting ones of those data types in order to collect all of the desired types of data. Receiver 1900 is further configurable to perform this selective tuning in a manner that maximizes the currency and retrieval speed for obtaining all of the data requested by the user. For example, if the user requests sports, weather, and traffic data types, and if station A broadcasts sports and traffic, station B broadcasts weather updated every hour and station C broadcasts weather updated every minute, receiver 1900 selects data from stations A and C to satisfy the user's data requests.

Furthermore, if stations A, B, and C transmit data sufficent to determine when each such station will next broadcast data of a particular type, receiver 1900 is configurable to determine an order of reception of such data that will minimize the time the a user must wait to obtain the desired information. For example, station A may transmit, every 10 seconds, data indicating that Station A re-sends all sports information every minute at 0 seconds after the minute and re-sends traffic information every minute at 15 seconds after the minute. Station B may transmit data indicating that it re-sends weather data every 15 seconds starting at 5 seconds after every minute, even though such data are only updated (i.e., replaced with more current information). Station C may transmit data indicating that it sends weather data only every minute at 0 seconds after the minute. If a user request for sports, weather, and traffic data is entered into at 55 seconds after a minute, receiver 1900 may select stations A and B for obtaining the requested information. Assuming the transmission time for each type of data is not significant, all of the user's information will be obtained from stations A and B by receiver 1900 by 15 seconds after the minute by tuner B 1906 being set to station A by 0 seconds after the minute, station B by 5 seconds after the minute, and station A again by 15 seconds after the minute. In contrast, use of stations A and C would require over one minute for the requested data to be acquired, as two portions of the information of interest to the user are broadcast by stations A and C at exactly the same time, and are only sent once per minute. Configured for operation in this manner, receiver 1900 selects which stations to use, and the order in which to tune to those stations, in a manner that minimizes the amount of time that the user needs to wait for the requested data. By decreasing response time in this manner, receiver 1900 is expected to increase user satisfaction with the data capabilities discussed herein.

In still another environment of operation, radio stations may designate a certain number of "frequent listener" points, similar to airlines' frequent flier points, for each broadcast program or for any duration of listening. In this environment, receiver 1900 receives data indicating the appropriate number of frequent listener points and stores that information in memory in a manner that can later be accumulated and remitted, for instance using a portable memory card. Related techniques to ensure that the program material is actually being listened to by the user may be used, for instance requiring the user to press a certain button or store certain data at a time announced on the main (audio) program channel. In still another variation, receiver 1900 when installed in an automobile may be coupled to the odometer of the automobile, and the miles driven while listening to the station may be accumulated as the measure of points. In any event, different stations may allocate different points at different times or for different programs, and one of the parameters that receiver 1900 may use to select among a plurality of stations that are broadcasting a selected type of program (or data) may be the value of points to be accrued by selecting a particular station. Thus, in addition to selecting a station based on signal strength or data re-send or update rate, receiver 1900 is also configurable to select a station based on such other criteria.

Numerous other variations of these embodiments will be apparent for any particular environment of use.

From the above description, it will be apparent that the invention disclosed herein provides a novel and advantageous broadcast data system with multiple tuner receiver. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A system for transmitting and receiving program material and data corresponding to the program material, comprising:
    a transmitter subsystem, including
        (i) a transmitter unit;
        (ii) program sources providing to the transmitter unit the program material, for transmission thereof;
        (iii) a data stream generator providing to the transmitter unit the data corresponding to the program material, for transmission thereof;
    a receiver subsystem, including
        (i) a first tuner detecting the program material;
        (ii) a second tuner detecting the data stream; and
        (ii) a processor configured to change an operating frequency of one of said first tuner and said second tuner in response to the data stream.

2. A receiver for the reception of program material and associated data, comprising:
    a first tuner configured to detect the program material;
    a second tuner configured to detect the data stream;
    a user interface operatively coupled to one of the first tuner and second tuner providing user selection of an item from a menu of data options corresponding to one of the program material and associated data; and
    a processor configured to change an operating frequency of one of the first tuner and second tuner in response to the item.

3. A receiver for the reception of program material and associated data, comprising:
    a first tuner unit configured to detect the program material;
    a second tuner unit for detect the data stream;
    a user interface operatively coupled to the second tuner unit providing user selection of an item from a menu of data options corresponding to the received data; and
    a processor coupled to the user interface and the first tuner unit, the processor configured to change an operating frequency of the first tuner unit in response to user selection of the item.

4. A receiver for the reception of program material and associated data, comprising:
    a first tuner unit configured to detect the program material;
    a second tuner unit configured to detect a data stream corresponding to the associated data, the second tuner unit also configured to scan a predetermined band of frequencies for additional data streams;
    a user interface operatively coupled to the second tuner unit providing user selection of an item from a menu of data options corresponding to said data stream and said additional data streams; and
    a processor coupled to the user interface and the first tuner unit, the processor configured to change an operating frequency of the first tuner unit in response to user selection of the item.

5. A receiver for the reception of program material and associated data, comprising:
    a first tuner unit configured to detect the program material;
    a second tuner unit configured to detect a data stream corresponding to the associated data, the second tuner unit also configured to scan a predetermined band of frequencies for additional data streams; and
    a processor coupled to the first tuner unit and the second tuner unit, the processor configured to change an operating frequency of the first tuner unit in response to a characteristic of the associated data.

6. A receiver as in claim 5, wherein the characteristic includes correspondence of program-identifying data from a first station with program-identifying data from a second station.

7. A receiver as in claim 6, wherein the characteristic includes signal strength from the first station not exceeding a predetermined threshold and signal strength from the second station exceeding the predetermined threshold.

8. A receiver as in claim 5, further including a user interface operatively coupled to the processor, the user interface displaying available program type choices, an operating frequency of the first tuner being determined in response to user selection of one of the available program type choices.

9. A method of transmitting and receiving program material and data corresponding to the program material, comprising:

transmitting said data, said data corresponding to program material being broadcast by a plurality of stations;

receiving said data;

processing said data; and selecting a frequency for reception of said program material in response to said processing.

10. A method as in claim 9, wherein said processing includes displaying information corresponding to program types on a user interface.

11. A method as in claim 9, wherein said processing includes determining which of a plurality of stations corresponding to a predetermined program type has a particular characteristic.

12. A method as in claim 11, wherein the particular characteristic is signal strength exceeding a threshold level.

* * * * *

REEXAMINATION CERTIFICATE (4158th)

United States Patent [19]
Takahisa et al.

[11] B1 5,812,937
[45] Certificate Issued   *Sep. 19, 2000

[54] BROADCAST DATA SYSTEM WITH MULTIPLE-TUNER RECEIVER

[75] Inventors: Tsutomu Takahisa, Santa Clara, Calif.; Koyo Hasegawa, Tokyo, Japan

[73] Assignee: Digital DJ Inc., Milpitas, Calif.

Reexamination Request:
No. 90/005,376, Jun. 15, 1999

Reexamination Certificate for:
Patent No.: 5,812,937
Issued: Sep. 22, 1998
Appl. No.: 08/643,801
Filed: May 6, 1996

[*] Notice: This patent is subject to a terminal disclaimer.

Related U.S. Application Data

[63] Continuation-in-part of application No. 08/549,655, Oct. 27, 1995, Pat. No. 5,577,266, which is a continuation-in-part of application No. 08/425,993, Apr. 20, 1995, Pat. No. 5,579,537, which is a continuation-in-part of application No. 08/045,352, Apr. 8, 1993, Pat. No. 5,491,838.

[51] Int. Cl.$^7$ ...................................................... H04B 7/00
[52] U.S. Cl. .................................................. 455/66; 455/45
[58] Field of Search ................................ 455/3.1, 6.3, 45, 455/66, 68, 70, 154.1, 158.2, 158.4, 158.5, 186.1, 185.1, 186.2, 161.1, 161.2, 184.1, 132–134; 381/3, 4

[56] References Cited

U.S. PATENT DOCUMENTS

4,823,398   4/1989   Hashimoto ............................. 455/134
5,457,815   10/1995  Morewit, II ......................... 455/161.1

FOREIGN PATENT DOCUMENTS

0275527   7/1988   European Pat. Off. .

*Primary Examiner*—Nguyen Vo

[57] ABSTRACT

A broadcast transmitting and receiving system includes a receiver having multiple tuners. A data tuner receives a data stream indicating the type of programming being broadcast by one or more stations. Based on information in the data stream, the frequency of operation of a sound tuner is adjusted to provide the user with a desired type of programming. Various modes of operation are provided, some employing a user interface and others being operable without user intervention.

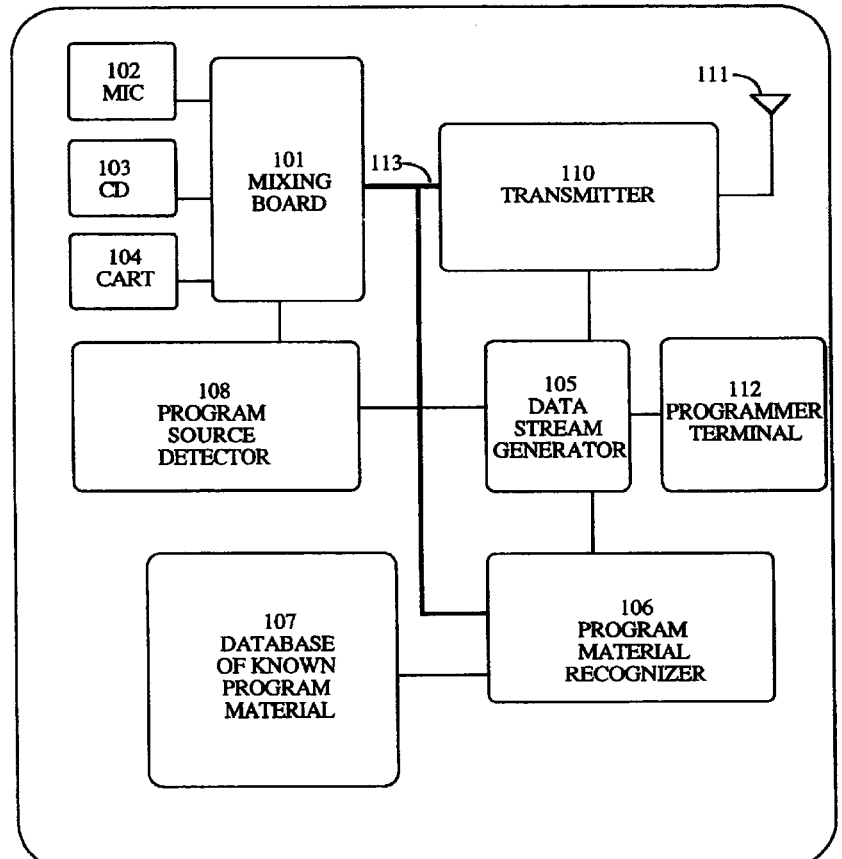

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–5 and 9 are determined to be patentable as amended.

Claims 6–8 and 10–12 dependent on an amended claim, is determined to be patentable.

1. A system for transmitting and receiving program material and data corresponding to the program material, comprising:
   a transmitter subsystem, including
      (i) a transmitter unit;
      (ii) program sources providing to the transmitter unit the program material, for transmission thereof;
      (iii) a data stream generator providing to the transmitter unit the data corresponding to the program material, for transmission thereof;
   a receiver subsystem, including
      (i) a first tuner *for* detecting the program material;
      (ii) a second tuner *for* detecting the data stream; and
      [(ii)] *(iii)* a professor configured to change an operating frequency of one of said first tuner and said second tuner in response to the data stream[.], *the processor further configured to enable the second tuner to scan an entire broadcast band for data transmissions indicating a type of program material being transmitted by at least one transmitter subsystem within a receiving range of the receiver subsystem, the processor including a tuning memory configured to store each program material detected by the second tuner and an associated frequency of each transmitter subsystem that transmits a detected program material;*
      *(iv) a user interface coupled to the processor and configured to display each detected program material stored in the tuning memory, wherein the processor enables the first tuner to tune to an appropriate frequency if the program material currently detected by the first tuner differs from a program material displayed in the user interface and subsequently selected by a user.*

2. A receiver for the reception of program material and associated data, comprising:
   a first tuner configured to detect the program material;
   a second tuner configured to detect the data stream;
   a user interface operatively coupled to one of the first tuner and second tuner providing user selection of an item from a menu of data options corresponding to one of the program material and associated data; and
   a processor configured to change an operating frequency of one of the first tuner and second tuner in response to the item[.], *the processor further configured to enable the second tuner to scan an entire broadcast band for data transmissions indicating a type of program material being transmitted by at least one transmitter subsystem within a receiving range of the receiver, the processor including a tuning memory configured to store each program material detected by the second tuner and an associated frequency of each transmitter subsystem that transmits a detected program material;* and
   *the user interface further coupled to the processor and further configured to display each detected program material stored in the tuning memory, wherein the processor enables the first tuner to tune to an appropriate frequency if the program material currently detected by the first tuner differs from a program material displayed in the user interface and subsequently selected by user.*

3. A receiver for the reception of program material and associated data, comprising:
   a first tuner unit configured to detect the program material;
   a second tuner unit [for] *configured to* detect the data stream;
   a user interface operatively coupled to the second tuner unit providing user selection of an item from a menu of data options corresponding to the received data; and
   a processor coupled to the user interface and the first tuner unit, the processor configured to change an operating frequency of the first unit in response to user selection of the item[.], *the processor further configured to enable the second tuner unit to scan an entire broadcast band for data transmissions indicating a type of program material being transmitted by at least one transmitter subsystem within a receiving range of the receiver, the processor including a tuning memory configured to store each program material detected by the second tuner unit and an associated frequency of each transmitter subsystem that transmits a detected program material; and*
   *the user interface further configured to display each detected program material stored in the tuning memory, wherein the processor enables the first tuner unit to tune to an appropriate frequency if the program material currently detected by the first tuner unit differs from a program material displayed in the user interface and subsequently selected by a user.*

4. A receiver for the reception of program material and associated data, comprising:
   a first tuner unit configured to detect the program material;
   a second tuner unit configured to detect a data stream corresponding to the associated data, the second tuner unit also configured to scan a predetermined band of frequencies for additional data steams;
   a user interface operatively coupled to the second tuner unit providing user selection of an item from a menu of data options corresponding to said data stream and said additional data streams; [and]
   a processor coupled to the user interface and the first tuner unit, the processor configured to change an operating frequency of the first tuner unit in response to user selection of the item[.], *the processor further configured to enable the second tuner unit to scan an entire broadcast band for data transmissions indicating a type of program material being transmitted by at least one transmitter subsystem within a receiving range of* the receiver, the processor including a tuning memory configured to store each program material detected by the second tuner unit and an associated frequency of each transmitter subsystem that transmits a detected program material; and the user interface further configured to display each detected program material stored in the tuning memory, wherein the processor enables the first tuner unit to tune to an appropriate frequency if the program material currently detected by the first tuner unit differs from a program material displayed in the user interface and subsequently selected by a user.

5. A receiver for the reception of program material and associated data, comprising:

a first tuner unit configured to detect the program material;

a second tuner unit configured to detect a data stream corresponding to the associated data, the second tuner unit also configured to scan a predetermined band of frequencies for additional data streams; [and]

a processor coupled to the first tuner unit and the second tuner unit, the processor configured to change an operating frequency of the first unit in response to a characteristic of the associated data[,], *the processor further configured to enable the second tuner to scan an entire broadcast band for data transmissions indicating a type of program material being transmitted by at least one transmitter subsystem within a receiving range of the receiver, the processor including a tuning memory configured to store each program material detected by the second tuner and an associated frequency of each transmitter subsystem that transmits a detected program material; and*

*a user interface coupled to the processor and configured to display each detected program material stored in the tuning memory, wherein the processor enables the first tuner unit to tune to an appropriate frequency if the program material currently detected by the first tuner unit differs from a program material displayed in the user interface and subsequently selected by a user.*

9. A method of transmitting and receiving program material and data corresponding to the program material, comprising:

transmitting said data, said data corresponding to program material being broadcast by a plurality of stations;

receiving said data corresponding to the program material *by use of a first tuner;* receiving said data *by use of a second tuner;* processing said data; [and]

selecting a frequency for reception of said program material in response to said processing[.]

*enabling the second tuner to scan an entire broadcast band for data transmissions indicating a data type corresponding to a program material being transmitted;*

*storing in memory each data type corresponding to a program material detected by the second tuner and an associated frequency of a transmitter subsystem that transmits a data type corresponding to the program material; and*

*displaying each detected program material stored in the tuning memory, and enabling the first tuner to tune to an appropriate frequency if the data corresponding to the program material currently being received by the first tuner differs from a data corresponding to a program material being displayed and subsequently selected by a user.*

* * * * *